US012009929B2

(12) United States Patent
Takeda et al.

(10) Patent No.: US 12,009,929 B2
(45) Date of Patent: Jun. 11, 2024

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Shaozhen Guo, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 636 days.

(21) Appl. No.: 17/264,581

(22) PCT Filed: Jul. 30, 2018

(86) PCT No.: PCT/JP2018/028434
§ 371 (c)(1),
(2) Date: Jan. 29, 2021

(87) PCT Pub. No.: WO2020/026296
PCT Pub. Date: Feb. 6, 2020

(65) Prior Publication Data
US 2021/0336726 A1 Oct. 28, 2021

(51) Int. Cl.
*H04L 1/1812* (2023.01)
*H04L 1/1867* (2023.01)
(Continued)

(52) U.S. Cl.
CPC .......... *H04L 1/1819* (2013.01); *H04L 1/1896* (2013.01); *H04W 72/0446* (2013.01);
(Continued)

(58) Field of Classification Search
None
See application file for complete search history.

(56) References Cited

U.S. PATENT DOCUMENTS 11,337,190 B2\* 5/2022 Lee .................. H04L 5/001
2004/0203705 A1 10/2004 Lundby
(Continued)

FOREIGN PATENT DOCUMENTS

JP    H8-154096 A    6/1996
JP    2005-532745 A    10/2005
(Continued)

OTHER PUBLICATIONS

Extended European Search Report issued for Application No. 18928593.5 dated Feb. 21, 2022 (13 pages).
(Continued)

*Primary Examiner* — Rebecca E Song
(74) *Attorney, Agent, or Firm* — Osha Bergman Watanabe & Burton LLP

(57) ABSTRACT

According to one aspect of the present disclosure, a user terminal includes a control section that determines, when an uplink control channel (PUCCH) repetition and a dynamic hybrid automatic repeat reQuest acknowledgement (HARQ-ACK) codebook are configured, a codebook for PUCCH transmission per slot based on at least one of a total downlink assignment index (T-DAI), a counter downlink assignment index (C-DAI), a timing from reception of a physical downlink shared channel (PDSCH) to transmission of the HARQ-ACK corresponding to the PDSCH and repetition factor, and a transmitting section that transmits HARQ-ACK based on the codebook by applying PUCCH repetition to the HARQ-ACK. According to one aspect of the present disclosure, it is possible to appropriately transmit the UCI even when the PUCCH repetition is used.

4 Claims, 16 Drawing Sheets

(51) Int. Cl.
  *H04W 72/0446* (2023.01)
  *H04W 72/21* (2023.01)
  *H04W 72/23* (2023.01)
  *H04W 72/54* (2023.01)

(52) U.S. Cl.
  CPC ........... *H04W 72/21* (2023.01); *H04W 72/23* (2023.01); *H04W 72/54* (2023.01)

(56) References Cited

U.S. PATENT DOCUMENTS

| | | |
|---|---|---|
| 2009/0207793 A1 | 8/2009 | Shen et al. |
| 2012/0176947 A1 | 7/2012 | Xi et al. |
| 2015/0131579 A1 | 5/2015 | Li et al. |
| 2016/0337086 A1 | 11/2016 | Shen et al. |
| 2017/0134140 A1* | 5/2017 | Park ................. H04B 7/0413 |
| 2019/0306922 A1* | 10/2019 | Xiong ................. H04W 72/21 |
| 2019/0327755 A1* | 10/2019 | Xiong ................. H04L 5/0046 |
| 2019/0349917 A1* | 11/2019 | Huang ................. H04L 1/1664 |
| 2020/0296720 A1 | 9/2020 | Bala et al. |
| 2021/0029694 A1 | 1/2021 | Nayeb Nazar et al. |
| 2021/0058922 A1* | 2/2021 | Han ................. H04L 5/0055 |
| 2021/0144684 A1* | 5/2021 | Yang ................. H04L 1/1858 |

FOREIGN PATENT DOCUMENTS

| | | |
|---|---|---|
| JP | 2012-506671 A | 3/2012 |
| JP | 2013-507067 A | 2/2013 |
| JP | 2014-506437 A | 3/2014 |

OTHER PUBLICATIONS

Office Action issued for Japanese Application No. 2020-533898 dated Apr. 5, 2022 (11 pages).

Qualcomm, "Aspects related to Interaction between Different TTI Lengths", 3GPP TSG RAN WG1 #93, R1-1807095, Busan, South Korea, May 21-25, 2018 (6 pages).
CATT, "Remaining issues on PUCCH for Rel-13 MTC UEs", 3GPP TSG RAN WG1 Meeting #83, R1-156562, Anaheim, USA, Nov. 15-22, 2015 (7 pages).
Office Action issued in counterpart Japanese Patent Application No. 2020-533898 dated Oct. 25, 2022 (8 pages).
Office Action issued in European Application No. 18928593.5, dated Feb. 21, 2023 (7 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
International Search Report for corresponding International Application No. PCT/JP2018/028434, dated Oct. 16, 2018 (5 pages).
Written Opinion for corresponding International Application No. PCT/JP2018/028434, dated Oct. 16, 2018 (6 pages).
3GPP TS 38.213 V15.2.0; "3rd Generation Partnership Project; Technical Specification Group Radio Access Network; NR; Physical layer procedures for control (Release 15)"; Jun. 2018 (17 pages).
NTT Docomo; "On HARQ-ACK feedback"; 3GPP TSG RAN WG1 Meeting #93, R1-1807067; Busan, Korea; May 21-25, 2018 (11 pages).
Office Action issued in Chinese Application No. 201880098082.4, dated Jun. 25, 2023 (12 pages).
CATT; "Remaining issues on HARQ-ACK codebook"; 3GPP TSG RAN WG1 Meeting #93, R1-1806301; Busan, Korea; May 21-25, 2018 (7 pages).
Office Action issued in counterpart Chinese Patent Application No. 201880098082.4 mailed on Nov. 17, 2023 (12 pages).
Intel Corporation; "Remaining aspects of PUCCH for MTC"; 3GPP TSG RAN WG1 Meeting #83, R1-156502; Anaheim, USA; Nov. 16-20, 2015 (5 pages).

* cited by examiner

USER TERMINAL AND RADIO COMMUNICATION METHOD

TECHNICAL FIELD

The present disclosure relates to a user terminal and a radio communication method in next-generation mobile communication systems.

BACKGROUND ART

In the universal mobile telecommunications system (UMTS) network, the specifications of long-term evolution (LTE) have been drafted for the purpose of further increasing high speed data rates, providing lower delays, and the like (see nonpatent literature 1). In addition, LTE-A (LTE Advanced, LTE Rel.10, 11, 12, 13) has been specified for the purpose of further increasing capacity, advancement, and the like of LTE (LTE Rel.8, 9).

Successor systems of LTE (for example, FRA (Future Radio Access), 5G (5th generation mobile communication system), 5G+ (plus), NR (New Radio), NX (New radio access), FX (Future generation radio access), LTE Rel.14 or 15 or later) is also being considered.

In the existing LTE systems (for example, LTE Rel.8-14), the user terminal (UE: User Equipment) uses at least one of a UL data channel (for example, PUSCH: Physical Uplink Shared Channel) and a UL control channel (for example, PUCCH: Physical Uplink Control Channel formation (UCI) to transmit uplink control information (UCI: Uplink Control Information).

Examples of the UCI may include retransmission control information (also called hybrid automatic repeat reQuest acknowledgement (HARQ-ACK), ACK/NACK, A/N, and the like) on downlink shared channel (PDSCH: Physical Downlink Shared Channel), scheduling request (SR), channel state information (CSI), and the like.

CITATION LIST

Non Patent Literature

Non Patent Literature 1: 3GPP TS 0.36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

In LTE, it is possible to repeatedly transmit HARQ-ACK using PUCCH only to UEs in which one serving cell is configured. Some restrictions need to be met for HARQ-ACK repetitions, even when HARQ-ACK repetitions are configured to be enabled.

The use of PUCCH repetition is also being considered even in NR. However, restrictions such as LTE have not yet been deeply examined for PUCCH repetition of NR. In addition, whether or not HARQ-ACK repetitions for different PDSCHs are allowed to be overlapped in one slot has not yet been investigated. Unless the behaviors of UEs, base stations, and the like are clarified for these contents, there is a risk that the UCI transmission cannot be performed properly, and communication throughput, frequency utilization efficiency, and the like will deteriorate.

Therefore, one of the objects of the present disclosure is to provide a user terminal and a radio communication method capable of appropriately transmitting UCI even when PUCCH repetition is used.

Solution to Problem

According to one aspect of the present disclosure, a user terminal includes a control section that determines, when an uplink control channel (PUCCH) repetition and a dynamic hybrid automatic repeat reQuest acknowledgement (HARQ-ACK) codebook are configured, a codebook for PUCCH transmission per slot based on at least one of a total downlink assignment index (T-DAI), a counter downlink assignment index (C-DAI), a timing from reception of a physical downlink shared channel (PDSCH) to transmission of the HARQ-ACK corresponding to the PDSCH and repetition factor, and a transmitting section that transmits HARQ-ACK based on the codebook by applying PUCCH repetition to the HARQ-ACK.

Advantageous Effects of Invention

According to one aspect of the present disclosure, it is possible to appropriately transmit the UCI even when the PUCCH repetition is used.

DESCRIPTION OF EMBODIMENTS (HARQ-ACK Repetition in LTE)

In LTE, it is possible to repeatedly transmit HARQ-ACK using PUCCH only to UEs in which one serving cell is configured. The one serving cell may be either a frequency division duplex (FDD) cell or a time division duplex (TDD) cell. In the case of the TDD cell, HARQ-ACK bundling is required for repetitive transmission of HARQ-ACK.

In the present disclosure, repetition transmission of HARQ-ACK, HARQ-ACK repetition, A/N repetition, UCI repetition, PUCCH repetition, repetition, and the like may be read interchangeably with each other.

The HARQ-ACK repetition can be configured in the UE using higher layer signaling (RRC parameter "ackNack-Repetition"). The RRC parameter includes a repetition factor. As the repetition factor, 2, 4, 6, and the like can be configured.

Note that in the present disclosure, the repetition factor and the repetition number may be read interchangeably with each other.

Even if the HARQ-ACK repetition is configured to be enabled, there are the following restrictions for HARQ-ACK repetition:

- The UE does not repeat, in subframe n, the HARQ-ACK transmission corresponding to the PDSCH transmission in subframes $n-N_{ANRep}-3$ to $n-5$,
- The UE transmits only the HARQ-ACK response corresponding to the PDSCH detected in subframe n−4 from subframe n to $n+N_{ANRep}-1$.
- The UE does not transmit other signals/channels from subframe n to $n+N_{ANRep}-1$,
- The UE does not perform repetitive transmission of a HARQ-ACK response corresponding to the PDSCH transmission detected in subframes $n-3$ to $n+N_{ANRep}-5$.

Here, $N_{ANRep}$ corresponds to the above-mentioned repetition factor.

Figure 1:
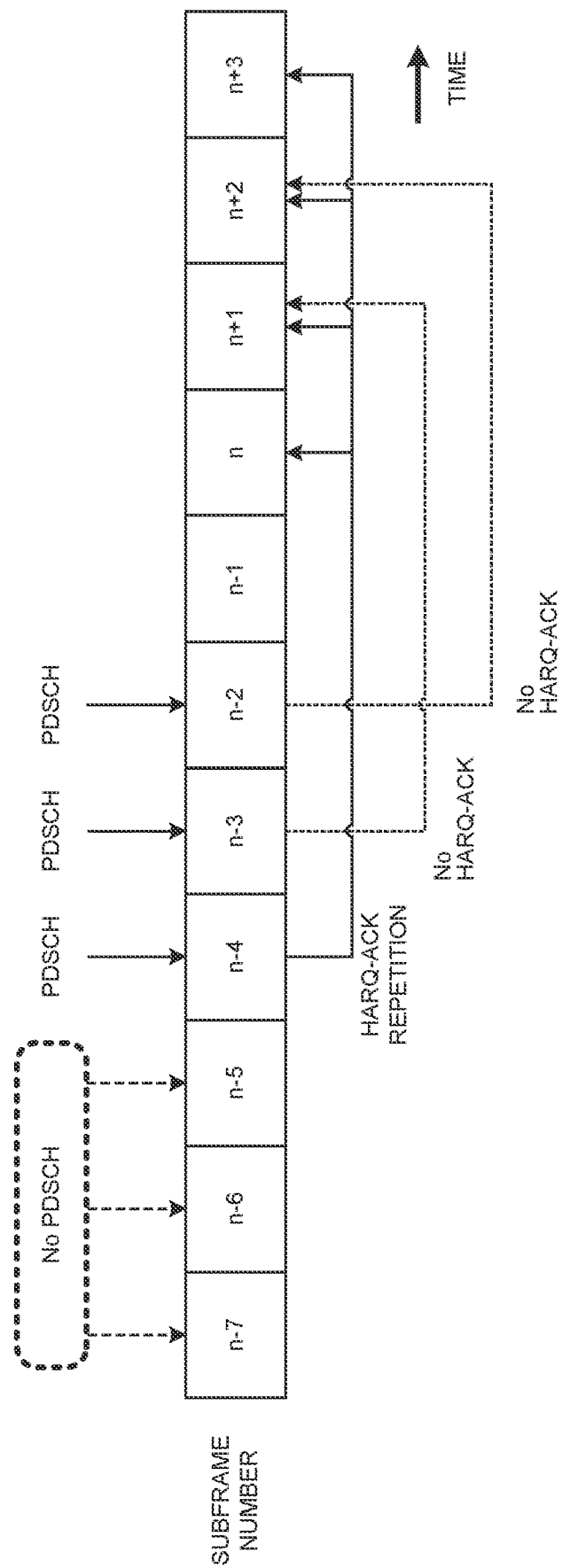
FIG. 1 is a conceptual explanatory diagram of restrictions on HARQ-ACK repetition in LTE.

FIG. 1 is a conceptual explanatory diagram of the restrictions of the HARQ-ACK repetition in the LTE. In this example, it is assumed that PDSCH is not detected in subframes n−7 to n−5, and the PDSCH for the UE is detected in subframes n−4 to n−2. In addition, in this example, $N_{ANRep}=4$.

The UE does not repeat, in subframe n, the HARQ-ACK transmission corresponding to the PDSCH transmission in subframes n−7 to n−5 (the HARQ-ACK is not transmitted because PDSCH is not originally detected in the corresponding subframe).

In this example, the UE performs the repetitive transmission on only the HARQ-ACK response corresponding to the PDSCH detected in subframe n−4 from subframe n to n+3.

In this case, the UE cannot transmit other signals/channels in subframes n to n+3. In addition, the UE cannot perform the repetitive transmission of the HARQ-ACK response corresponding to the PDSCH transmission detected in subframes n−3 to n−1.

(HARQ-ACK Codebook)

The NR is considering that the UE determines the HARQ-ACK codebook (may be referred to as the HARQ-ACK size) semi-statically or dynamically. The base station may notify the UE of information (for example, information indicating whether the HARQ-ACK codebook is semi-static or dynamic) indicating how to determine the HARQ-ACK codebook using the higher layer signaling for each component carrier (CC), each cell group (CG), each PUCCH-group, or each UE.

Note that the HARQ-ACK codebook may be read according to a PDSCH HARQ-ACK codebook, a HARQ-ACK codebook size, the number of HARQ-ACK bits, and the like.

Note that in the present disclosure, the higher layer signaling may be, for example, any one of radio resource control (RRC) signaling, medium access control (MAC) signaling, broadcast information, or a combination thereof.

As the MAC signaling, for example, a MAC control element (MAC CE), a MAC protocol data unit (MAC PDU), or the like may be used. Examples of broadcast information may include master information block (MIB), system information block (SIB), remaining minimum system information (RMSI), other system information (OSI), and the like.

The UE may determine (generate) the HARQ-ACK information bit based on the determined HARQ-ACK codebook for each component carrier (CC), each cell group (CG), each PUCCH-group, or each UE, and transmit the generated HARQ-ACK using at least one of the uplink control channel (PUCCH: Physical Uplink Control Channel) and the uplink shared channel (PUSCH: Physical Uplink Shared Channel).

When the UE is configured to determine a HARQ-ACK codebook semi-statically (or a semi-static HARQ-ACK codebook), the determination of the HARQ-ACK codebook may be referred to as type 1 HARQ-ACK codebook determination. When the UE is configured to determine a HARQ-ACK codebook dynamically (or a dynamic HARQ-ACK codebook), the determination of the HARQ-ACK codebook may be referred to as type 2 HARQ-ACK codebook determination.

That is, the type 1 HARQ-ACK codebook and the semi-static HARQ-ACK codebook may be read interchangeably with each other. In addition, the type 2 HARQ-ACK codebook and the dynamic HARQ-ACK codebook may be read interchangeably with each other.

In the type 1 HARQ-ACK codebook determination, the UE may determine the number of HARQ-ACK bits and the like based on the configuration established by the higher layer signaling. The established configuration may include, for example, the number (for example, maximum number, minimum number, and the like) of DL transmissions (for example, PDSCH) scheduled over the range associated with HARQ-ACK feedback timing.

This range is also called a HARQ-ACK bundling window, a HARQ-ACK feedback window, a bundling window, a feedback window, and the like. The bundling window may correspond to a range of at least one of space, time, and frequency.

On the other hand, in the type 2 HARQ-ACK codebook determination, UE may determine the number of HARQ-ACK bits based on a bit string of the DL assignment index (DAI) field included in the downlink control information (for example, DL assignment).

Note that the DAI field may indicate one or both of the total DAI (T-DAI) and the counter DAI (C-DAI). The T-DAI may be information on the total number of DL data (PDSCH) scheduled, and may correspond to the total number of bits (or codebook size) of HARQ-ACK fed back by the UE.

The C-DAI indicates a cumulative value of the scheduled DL data (PDSCH). For example, the DCI of one or a plurality of CCs detected within a certain time unit (slot or subframe) may include C-DAIs numbered in a CC index order, respectively. In addition, when the HARQ-ACK for PDSCH scheduled over a plurality of time units is fed back together (for example, when the bundling window is composed of a plurality of slots), the C-DAI may be applied over the plurality of time units.

(PDSCH-to-ACK Timing)

In the NR, the UE determines the PDSCH with the timing (PDSCH-to-ACK timing, which may be called "K1") from the reception of the PDSCH to the transmission of the HARQ-ACK corresponding to the PDSCH based on the DCI (may be referred to as DL DCI, DL Assignment, DCI Format 1_0, DCI Format 1_1, and the like) scheduling the PDSCH.

For example, when detecting DCI format 1_0, the UE transmits the HARQ-ACK corresponding to the PDSCH in slot n+k (for example, k is an integer from 1 to 8) relative to slot n including the final symbol of the PDSCH, based on the "PDSCH-to-HARQ-timing-indicator field" included in the DCI.

When detecting DCI format 1_1, the UE transmits the HARQ-ACK corresponding to the PDSCH in slot n+k relative to slot n including the final symbol of the PDSCH, based on the "PDSCH-to-HARQ-timing-indicator field" included in the DCI. Here, the correspondence between k and the above timing indicator field may be configured in the UE for each PUCCH (or PUCCH group, cell group) by the higher layer signaling.

For example, the above correspondence may be configured by parameters (may be called dl-DataToUL-ACK, Slot-timing-value-K1, and the like) included in the PUCCH Config information element of RRC signaling. For example, K1 may configure a plurality of candidate values for PDSCH-to-ACK timing indications by the higher layer signaling, and DCI for scheduling PDSCH may indicate one of the plurality of candidate values.

The K1 may be configured for each PUCCH group (or cell group). K1 may be the time determined based on numerology (for example, SCS) of the channel (for example, PUCCH or PUSCH) transmitting the HARQ-ACK.

(HARQ-ACK Repetition in NR)

However, in the NR, the PUCCH repetition can be configured, by the higher layer signaling, for PUCCH formats 1, 3, and 4 whose transmission period is 4 symbols or more. The repetition factor may be configured in common for all PUCCH formats 1, 3, and 4.

The UE may repeat the UCI, which is transmitted by PUCCH in the first slot of the number of repetitions, even in the remaining slots of the number of repetitions. The number of symbols for PUCCH and the starting symbol may be the same in each slot to which the repetition is applied. Note that the PUCCH repetition may be performed in continuous slots or in non-continuous slots.

However, restrictions such as LTE have not yet been deeply examined for PUCCH repetition of NR. In addition, whether or not HARQ-ACK repetitions for different PDSCHs are allowed or considered to be overlapped in one slot has not yet been investigated. Unless the behaviors of UEs are clarified for these contents, there is a risk that the UCI (HARQ-ACK) transmission cannot be performed properly, and communication throughput, frequency utilization efficiency, and the like will deteriorate.

Therefore, the present inventors conceived the configuring for appropriately transmitting UCI and the operation of the UE and the base station even when the PUCCH repetition is used in the NR.

Hereinafter, embodiments according to the present disclosure will be described in detail with reference to the drawings. The radio communication method according to each embodiment may be applied individually or in combination.

Note that in the following embodiments, the PUCCH and PUCCH repetitions may be read interchangeably with each other.

Radio Communication Method

First Embodiment

In a first embodiment, restrictions of PUCCH repetition will be described. The first embodiment can be classified roughly into two. One corresponds to a case where the PUCCH repetition is not restricted (or relatively few restrictions) (Embodiment 1.1), and the other corresponds to a case where the PUCCH repetition is restricted (or relatively many restrictions) (Embodiment 1.2).

Embodiment 1.1

In embodiment 1.1, the PUCCH repetition may be available for any UCI type. In addition, the PUCCH repetition may be available for any of a case where UCI is transmitted periodically (for example, periodic CSI (P-CSI (report), a case where the UCI is transmitted aperiodically (for example, aperiodic CSI (A-CSI (report), and a case where the UCI is transmitted with semi-persistent resources (for example, semi-persistent CSI (SP-CSI) report).

Note that the UCI type means any one of HARQ-ACK, SR (positive SR, negative SR), CSI (CSI may include CSI part 1, CSI part 2, and the like), or a combination thereof.

Note that the CSI may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), layer 1 reference signal received power (L1-RSRP), reference signal received quality (L1-RSRQ), a signal to interference plus noise ratio (L1-SINR), a signal to noise ratio (L1-SNR), and the like.

A CSI part 1 may include information with a relatively small number of bits (for example, RI, wideband CQI, and the like). A CSI part 2 may include information (for example, subband CQI, PMI, and the like) with a relatively large number of bits such as information determined based on the CSI part 1.

When the PUCCH repetition is configured in a control unit, the UE may repeatedly transmit UCI (for example, any one of HARQ-ACK, SR, or CSI or a combination thereof) in the PUCCH, for one or a plurality of (for example, all) component carriers (CC) in the control unit.

Note that in the present disclosure, the control unit may be, for example, any one of CC, CC group, cell group, PUCCH-group, MAC entity, frequency range (FR), band, a bandwidth part (BWP), or a combination thereof. The control unit may be simply called a group.

The UE may assume that the plurality of PUCCH repetitions do not overlap in one slot when the PUCCH repetition are configured. For example, when the PUCCH repetition is configured, the UE may not expect that downlink semi-persistent scheduling (DL SPS), SR, P-CSI report, and SP-CSI report having a cycle shorter than the duration of the PUCCH repetition are configured. The duration of the PUCCH repetition may be a slot for the repetition factor.

Figure 2:
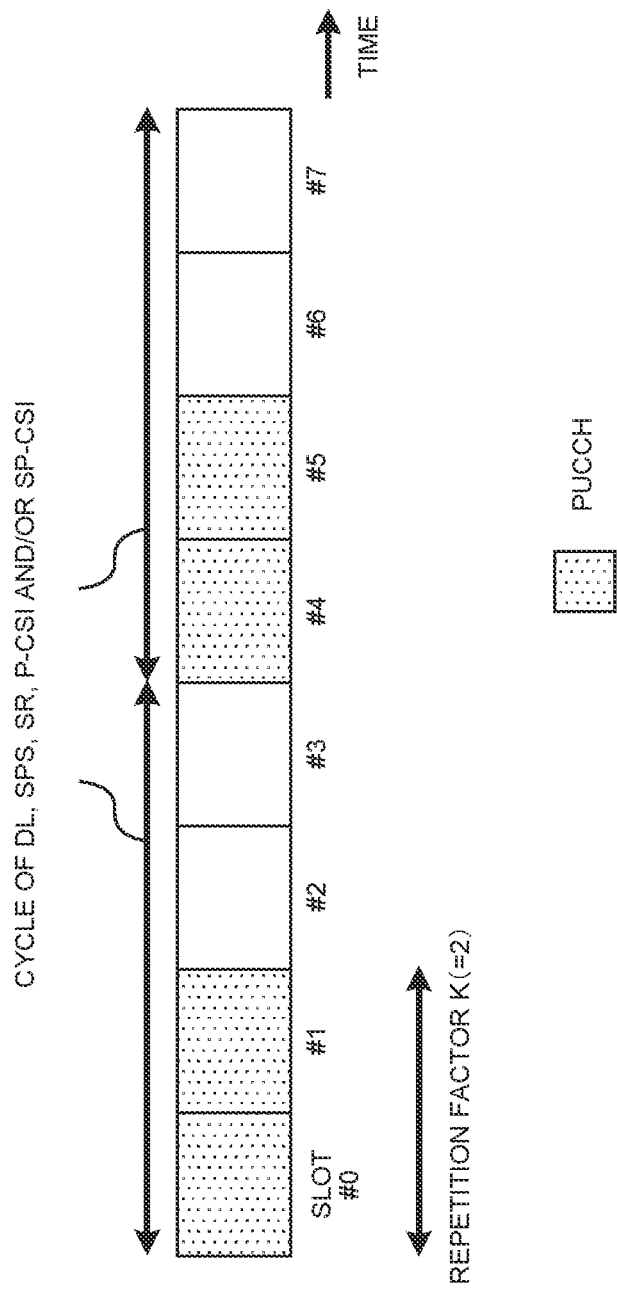
FIG. 2 is a diagram illustrating an example of a case where it is assumed that PUCCH repetitions do not overlap in one slot in a first embodiment.

FIG. 2 is a diagram illustrating an example of a case where it is assumed that the PUCCH repetitions do not overlap in one slot in a first embodiment. In this example, the UE configures PUCCH repetition (repetition factor K=2) in 2 slots. In this case, the UE may assume that the DL SPS, SR, P-CSI report, and SP-CSI report having a cycle shorter than 2 slots are not configured. In the case of this example, for example, it is assumed that cycles of the DL SPS, SR, P-CSI report, and SP-CSI report which are configured in the UE are 4 slots.

For example, when the UE transmits HARQ-ACK for DL SPS using PUCCH, the slots used for PUCCH repetition transmission are #4n and #4n+1 (n=0, 1, . . . ), so a plurality of PUCCH repetitions do not overlap in the same slot.

On the other hand, when the PUCCH repetition is configured and at least one of the DL SPS, SR, P-CSI report, and SP-CSI report having a cycle shorter than the duration of the PUCCH repetition is configured, the UE may override the previous PUCCH repetition with another latest PUCCH repetition.

Figure 3:
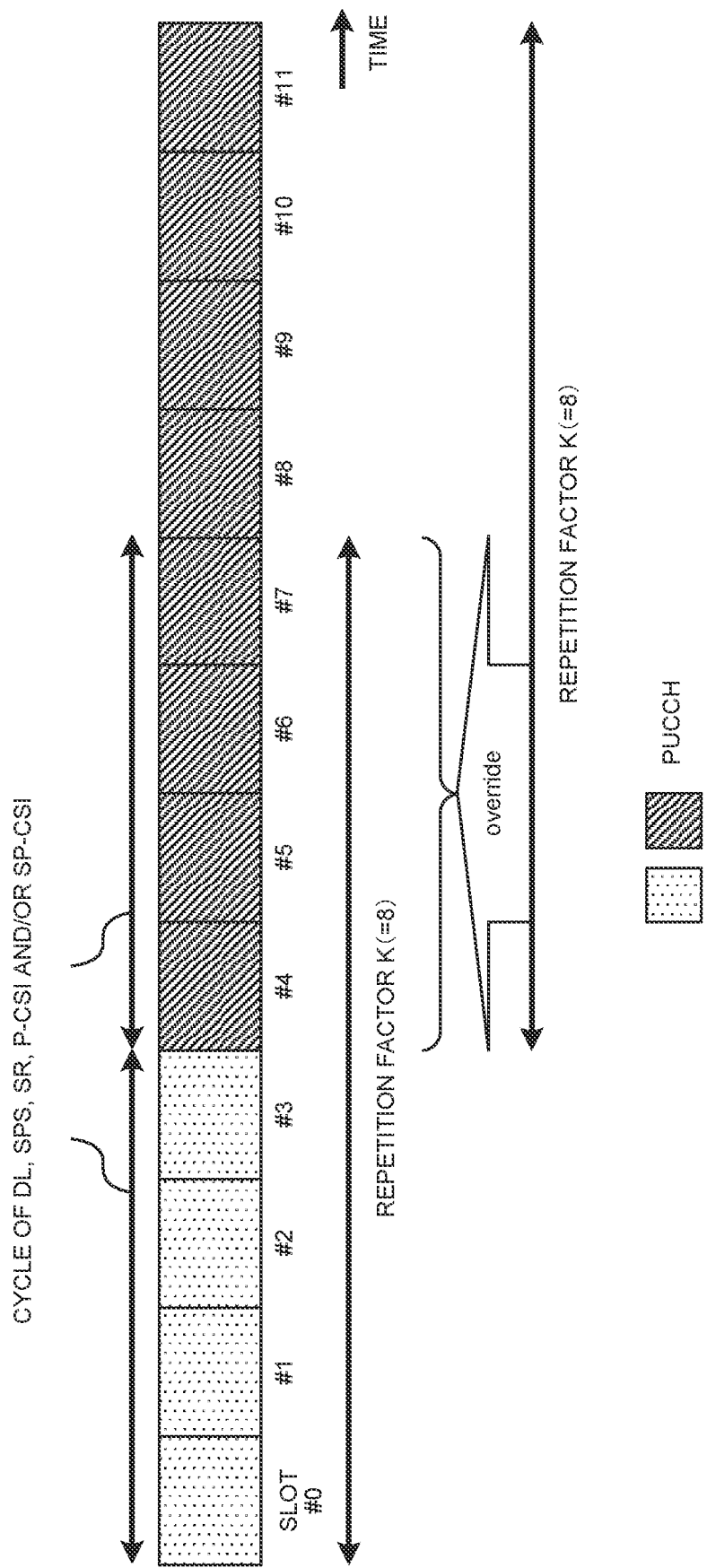
FIG. 3 is a diagram illustrating an example of a case where it is assumed that the PUCCH repetitions do not overlap in one slot in the first embodiment.

FIG. 3 is a diagram illustrating another example of a case where it is assumed that the PUCCH repetitions do not overlap in one slot in a first embodiment. In this example, the UE configures PUCCH repetition (repetition factor K=8) in 8 slots. In addition, it is assumed that a cycle of at least one of the DL SPS, SR, P-CSI report, and SP-CSI report which are configured in the UE is 4 slots.

In this case, for example, the first PUCCH repetition (PUCCH repetition in slots #0 to #7) starting from slot #0 overlaps with the second PUCCH repetition (PUCCH repetition in slots #4 to #11) starting from slot #4.

The UE may transmit the PUCCH repetition from slot #4 which is the latest PUCCH repetition, in slots #4 to #7.

In other words, when the second PUCCH repetition starts in the middle of the first PUCCH repetition, the UE interrupts the first PUCCH repetition that started transmission earlier and performs the second PUCCH repetition.

Note that the PUCCH repetition may be used for one carrier or for a plurality of carriers. In addition, the PUCCH repetition may be used for either an FDD carrier or a TDD carrier.

The PUCCH repetition may be used for specific data types with certain requirements (for example, delay, reliability). The specific data type may be identified by, for example, an RNTI (Radio Network Temporary Identifier) in which the CRC of data is masked, a bearer of data, a QCI (Quality of service Class Identifier), or the like.

Embodiment 1.2

In embodiment 1.2, a PUCCH repetition may be assumed to be used for at least one of HARQ-ACK and SR and not to be used for other UCI types.

For example, a UE in which the PUCCH repetition is configured may transmit HARQ-ACK over K times PUCCH repetition. In this case, the UE may not expect that the HARQ-ACK of K times PUCCH repetitions collide with other UCI types (for example, SR and CSI).

In addition, when the transmission period of the other UCI types collides with the HARQ-ACK of the K times PUCCH repetitions, the UE may also drop the other UCI types or may make the transmission pending.

The UE in which the PUCCH repetition is configured may transmit at least one of HARQ-ACK and SR over K times PUCCH repetitions. In this case, the UE may assume that the SR occasion can only collide with the first repetition (first slot) of the HARQ-ACK of the K times PUCCH repetitions.

Also, the UE may not expect that the K times PUCCH repetition collides with other UCI types (CSI or the like). In addition, when the transmission period of the other UCI types (CSI and the like) collides with the HARQ-ACK of the K times PUCCH repetitions, the UE may also drop the other UCI types or may make the transmission pending.

The PUCCH repetition may be used only in at least one of the following conditions:
Non-carrier aggregation (carrier aggregation is not configured in UE),
Carrier aggregation up to X CCs (for example, X=2),
FDD only,
FDD+TDD (for example, UL/DL ratio is in a specific range (0.4 or more)) of a specific UL-DL configuration,
Non-code block group (CBG) based re-transmission (Non-CBG re-transmission),
HARQ-ACK bundling for PUCCH or both PUCCH and PUSCH,
HARQ-ACK bundling for at least PUCCH.

According to the first embodiment described above, the conditions, restrictions, and the like to which the PUCCH repetition is applied can be appropriately configured in the UE. In addition, the UE can perform the processing on the PUCCH repetition based on appropriate assumptions.

Second Embodiment

In a second embodiment, a UE in which the PUCCH repetition is configured may not expect that in a serving cell within one control unit (for example, CG, PUCCH-group), PDSCH with which HARQ-ACKs for different PDSCHs partially overlaps are scheduled in one or a plurality of slots. The UE may assume that a scheduler of the base station enforces such PDSCH schedule restrictions.

After the UE determines a PUCCH resource for repetition in one control unit (for example, CG, PUCCH-group), a serving cell within the same control unit, the UE may discard or ignore PDCCH (DCI) scheduling PDSCH by which a plurality of PUCCHs are overlapped in one or a plurality of slots.

After the UE determines a PUCCH resource for repetition in once one control unit, in a serving cell within the same control unit, the UE may assume that the scheduling of the PDSCH by which a plurality of PUCCH repetitions are overlapped in one or a plurality of slots is not allowed (which do not have to assume such a schedule).

Figure 4:
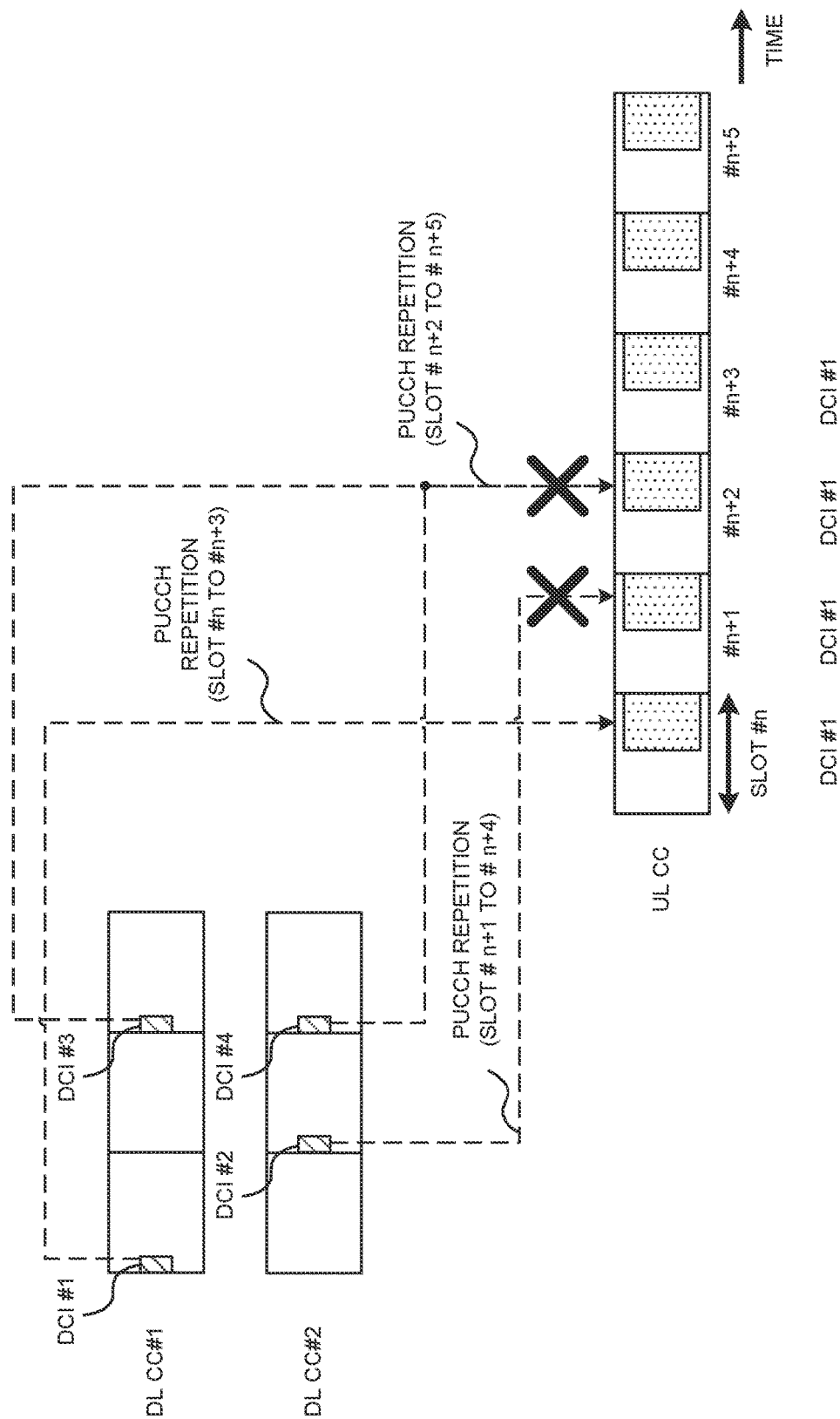
FIG. 4 is a diagram illustrating an example of PUCCH repetition in a second embodiment.

FIG. 4 is a diagram illustrating an example of PUCCH repetition in a second embodiment. In this example, the UE configures a control unit (CG, PUCCH-group) including two DL CCs (DL CC #1, #2), and considers that the PUCCH (HARQ-ACK) repetition is transmitted in a given UL CC according to the PDSCH in these DL CCs. Note that at least two CCs, DL CC #1 and DL CC #2, and the UL CC may be included in the same CC.

In addition, the UE receives DCI #1 and #3 in DL CC #1, and receives DCI #2 and #4 in DL CC #2. The UE detects DCI #1 in one slot, detects DCI #2 in the next slot, and furthermore detects DCI #3 and #4 in the next slot.

Both the DCI #1 to #4 may be DCIs that schedule PDSCH. The UE configures a value of the repetition factor K of the PUCCH repetition as 4.

The DCI #1 indicates the PUCCH repetition from slot #n to #n+3 in the UL CC. For example, the DCI #1 may indicate that the transmission timing of the HARQ-ACK for PDSCH whose schedule is indicated by the DCI #1 starts from #n.

The DCI #2 indicates the PUCCH repetition from slot #n+1 to #n+4 in the UL CC. The DCIs #3 and #4 indicate the PUCCH repetition from slot #n+2 to #n+5 in the UL CC.

Note that unless otherwise specified, the cases where the CC configuration, the configuration of the PUCCH repetition, and the received DCI are the same will be described in the following drawing. However, this disclosure is not limited to the application to this case.

Now, in the example of FIG. 4, the UE starts the PUCCH repetition from slot #n based on the DCI #1. The UE discards the DCIs #2 to #4 because the PUCCH repetition based on the DCIs #2 to #4 overlaps with the PUCCH repetition based on the DCI #1.

According to the second embodiment described above, the overlapping of the PUCCH repetition can be suppressed, and the complexity of the UE processing can be suppressed.

Third Embodiment

In a third embodiment, in a serving cell within one control unit (for example, CG, PUCCH-group), a UE in which a PUCCH repetition is configured may schedule PDSCH with which HARQ-ACK for different PDSCHs partially overlaps in one or a plurality of slots.

In the third embodiment, the UE is assumed that a dynamic HARQ-ACK codebook is configured.

For the dynamic HARQ-ACK codebook, the UE may determine the codebook for each PUCCH transmission in each slot based on at least one of the following:
(1) C-DAI,
(2) T-DAI,
(3) K1,
(4) PUCCH repetition factor.

Here, C-DAI, T-DAI, and K1 may be specified by, for example, DCI. The PUCCH repetition factor may be configured, for example, by RRC.

The UE may assume that HARQ-ACK is not dropped at each repetition. In other words, the UE may assume that at least one of the codebook size and the PUCCH format changes during the PUCCH repetition. In this case, the UE can firmly transmit the HARQ-ACK corresponding to each DCI (PDSCH) as many as the number of repetition factors.

Figure 5:
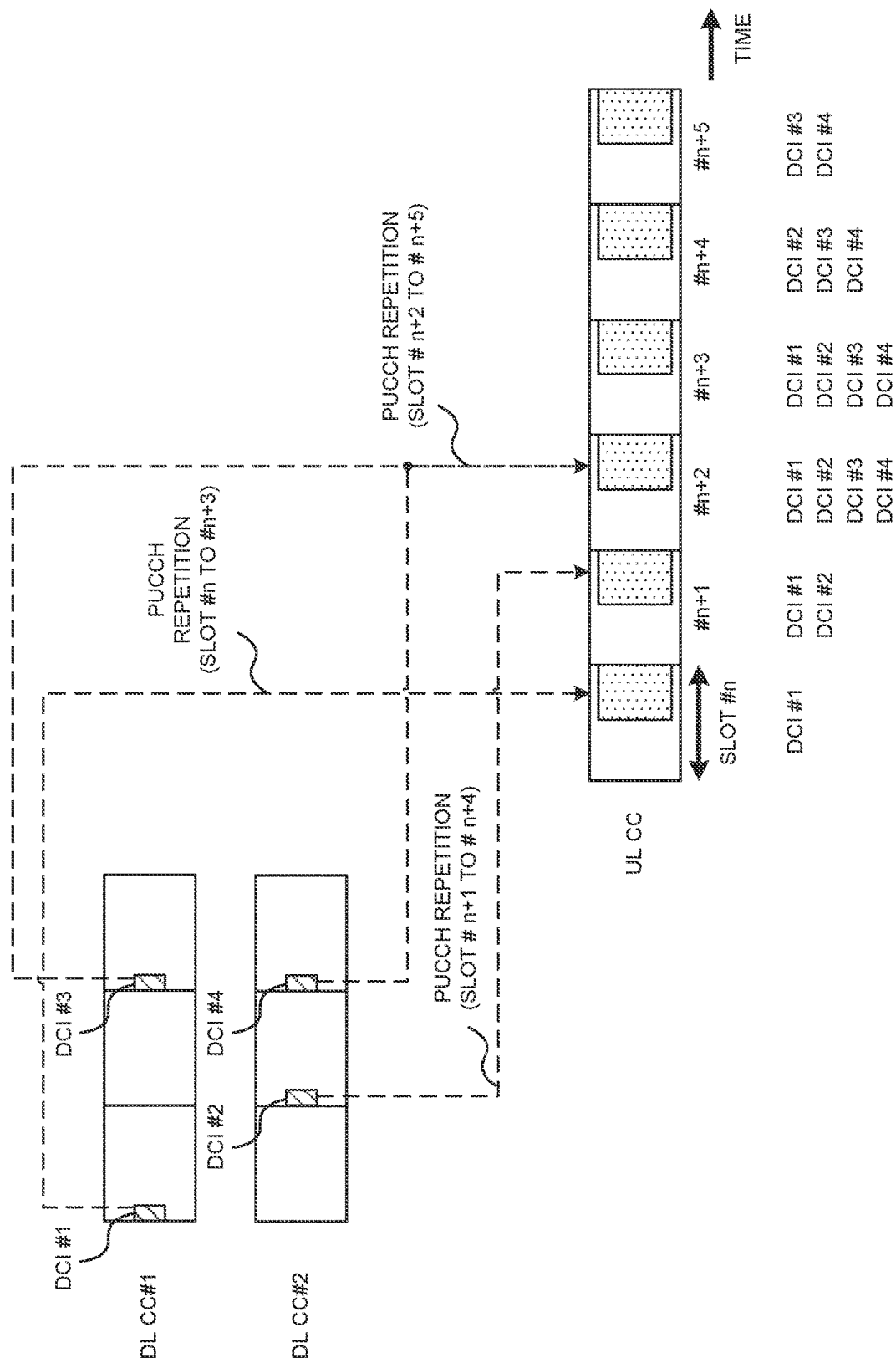
FIG. 5 is a diagram illustrating a first example of PUCCH repetition in a third embodiment.

FIG. 5 is a diagram illustrating a first example of PUCCH repetition in a third embodiment. In this example, it is allowed (or assumed) that the codebook size (the number of HARQ-ACK bits corresponding to DCI) is different in each slot during the PUCCH repetition.

The UE may transmit HARQ-ACKs in slots #n to #n+5, respectively, corresponding to the following DCIs (more specifically, corresponding to PDSCHs scheduled by the following DCIs):
  Slot #n: DCI #1
  Slot #n+1: DCIs #1 and #2
  Slot #n+2: DCIs #1, #2, #3, and #4
  Slot #n+3: DCIs #1, #2, #3, and #4
  Slot #n+4: DCIs #2, #3, and #4
  Slot #n+5: DCIs #3 and #4

The UE may assume that the HARQ-ACK can be dropped in one or a plurality of repetitions. In other words, the UE may assume that the codebook size and the PUCCH format do not change (are maintained) during the PUCCH repetition.

For the dynamic HARQ-ACK codebook, the UE may control A/N for later PDSCH to override A/N for previous PDSCH in a certain slot in the PUCCH repetition. That is, when the plurality of PUCCH repetitions overlap, the UE may transmit the A/N for later PUCCH repetition.

Figure 6:
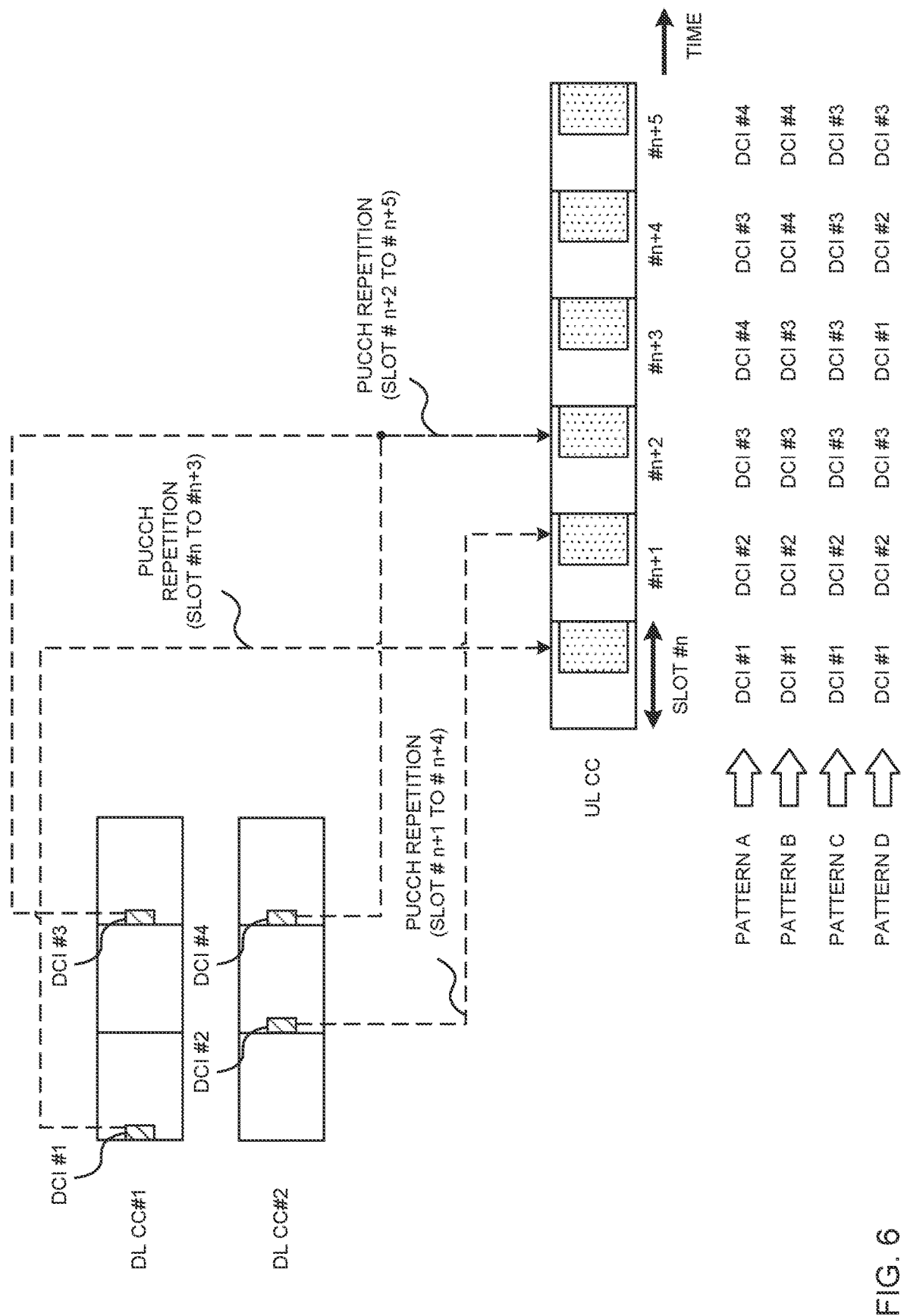
FIG. 6 is a diagram illustrating a second example of the PUCCH repetition in a third embodiment.

FIG. 6 is a diagram illustrating a second example of the PUCCH repetition in the third embodiment. In this example, the codebook size (the number of HARQ-ACK bits corresponding to DCI) is maintained to be the same in each slot during the PUCCH repetition.

The UE may transmit HARQ-ACKs corresponding to the following DCIs in slots #n to #n+5, respectively (Pattern A):
  Slot #n: DCI #1
  Slot #n+1: DCI #2
  Slot #n+2: DCI #3
  Slot #n+3: DCI #4
  Slot #n+4: DCI #3
  Slot #n+5: DCI #4

The UE may transmit HARQ-ACKs corresponding to the following DCIs in slots #n to #n+5, respectively (Pattern B):
  Slot #n: DCI #1
  Slot #n+1: DCI #2
  Slot #n+2: DCI #3
  Slot #n+3: DCI #3
  Slot #n+4: DCI #4
  Slot #n+5: DCI #4

The UE transmits A/N for DCI #1 in slot #n. In slot #n+1, the UE drops the A/N for DCI #1 that has already been transmitted and transmits later A/N for DCI #2.

In slot #n+2, the UE drops the A/Ns for DCIs #1 and #2 that have already been transmitted and transmits later A/N for DCI #3. Note that when there are a plurality of later DCIs (DCI #3 and #4) such as slot #n+2, the UE may transmit the A/N for DCI determined based on given rules. For example, the given rule may preferentially select the DCI having the smaller value of a cell index that receives the DCI. The given rules may be configured by the higher layer signaling or may be specified by the specification.

The pattern A corresponds to a policy of transmitting the A/N for DCI that has not yet transmitted as soon as possible. Therefore, in the example of the pattern A, in slot #n+4, the UE drops the A/Ns for DCI #1 to #3 that have already been transmitted and transmits A/N for DCI #4 that has not yet been transmitted.

In slot #n+4 of the pattern A, all the A/Ns for DCIs #1 to #4 have already been transmitted once, and therefore, among all the A/Ns of DCIs #1 to #4, the latest A/N for DCI #3 or #4 is transmitted. In slot #n+5 of the pattern A, in the A/N for DCI #3 or #4, A/N which was not transmitted in slot #n+4 may be transmitted.

The pattern B corresponds to the policy of transmitting the A/N for one DCI in advance in several slots and then transmitting the A/N for another DCI when there are a plurality of new DCIs. For example, when there are X later DCI A/Ns that have not been transmitted, the UE may continuously perform the repetitive transmission on each DCI K/X (rounded up, rounded down, or rounded off if indivisible).

In the example of FIG. 6, K/X=2. Therefore, in the pattern B, the A/N for DCI #3 is transmitted in slots #n+2 and #n+3, and the A/N for DCI #4 is transmitted in slots #n+4 and #n+5.

Figure 7:
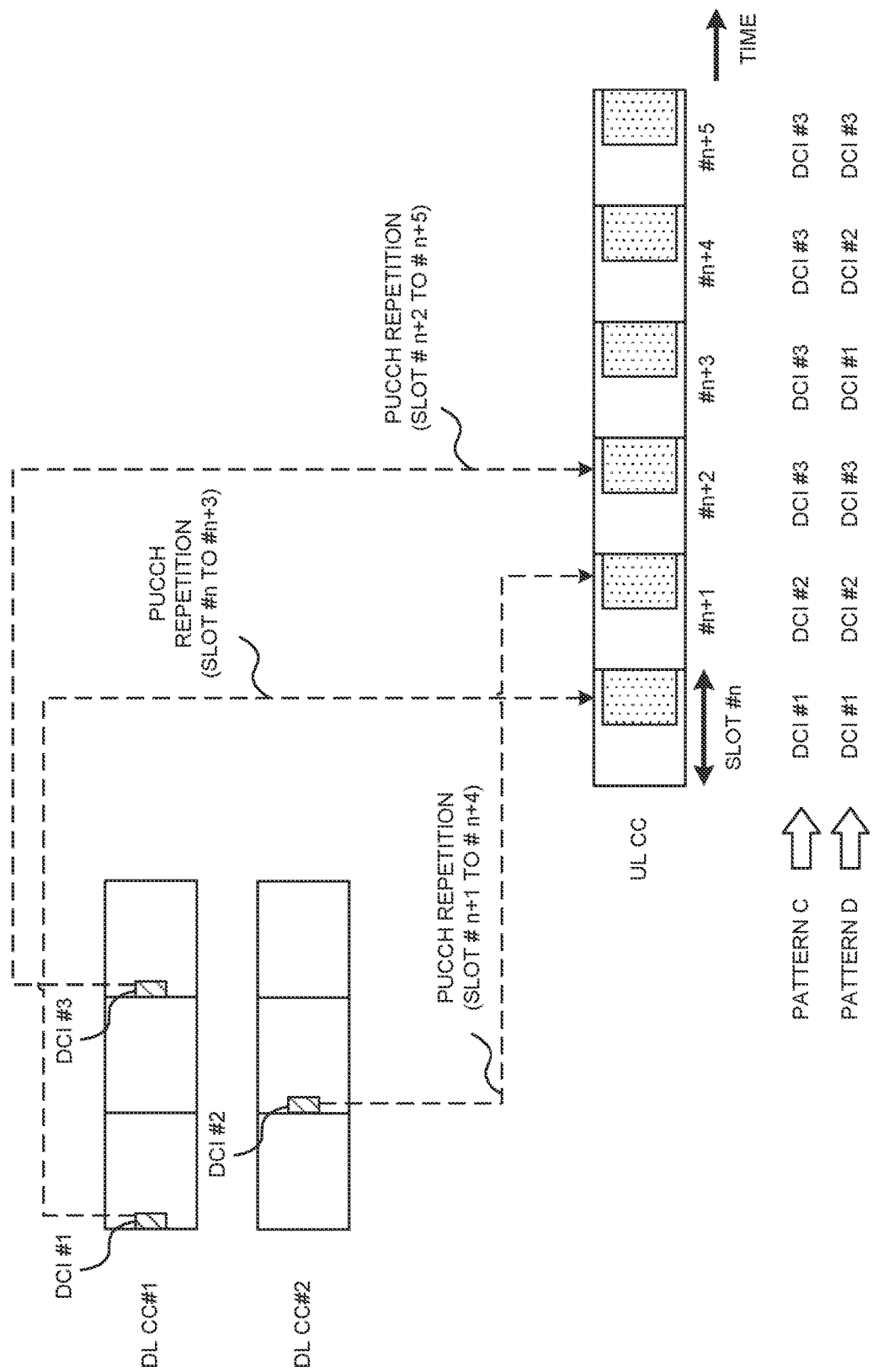
FIG. 7 is a diagram illustrating a third example of the PUCCH repetition in the third embodiment.

FIG. 7 is a diagram illustrating a third example of the PUCCH repetition in the third embodiment. In this example, the codebook size (the number of HARQ-ACK bits corresponding to DCI) is maintained to be the same in each slot during the PUCCH repetition. This example differs from the example in FIG. 4 in that the UE does not detect DCI #4.

The UE may transmit HARQ-ACKs corresponding to the following DCIs in slots #n to #n+5, respectively (Pattern C):
  Slot #n: DCI #1
  Slot #n+1: DCI #2
  Slot #n+2: DCI #3
  Slot #n+3: DCI #3
  Slot #n+4: DCI #3
  Slot #n+5: DCI #3

The UE may transmit HARQ-ACKs corresponding to the following DCIs in slots #n to #n+5, respectively (Pattern D):
  Slot #n: DCI #1
  Slot #n+1: DCI #2
  Slot #n+2: DCI #3
  Slot #n+3: DCI #1
  Slot #n+4: DCI #2
  Slot #n+5: DCI #3

Slots #n to #n+3 are the same as in the example in FIG. 6, and therefore, a duplicate description thereof will not be performed.

When the pattern C finishes transmitting the A/Ns for the plurality of PUCCH repetitions at least once (it can be read as the end of the first transmission of PUCCH repetition for later PDSCH, or the absence of the later DCI, or the like), the UE corresponds to the policy of continuously transmitting A/N for latest DCI. Therefore, in the example of the pattern C, in slots #n+4 to #n+6, the UE transmits the A/N for latest DCI #3 among the A/Ns for DCIs #1 to #3 that have already been transmitted.

The pattern D corresponds to the policy that the UE transmits the A/N in a round-robin manner when the A/Ns for the plurality of PUCCH repetitions have been transmitted at least once. Therefore, in the example of the pattern D, in slots #n+4 to #n+6, the UE transmits the A/Ns for DCIs #1 to #3 that have already been transmitted sequentially in the rotation.

Note that the UE may determine the A/N to be transmitted based on another policy. For example, when the UE has finished transmitting all the overlapping A/Ns, the UE may continue to transmit the A/N for DCI (PDSCH) corresponding to a specific service. The specific service may be, for example, at least one such as eMBB (enhanced Mobile Broad Band), mMTC (massive Machine Type Communication), IoT (Internet of Things), URLLC (Ultra Reliable and Low Latency Communications), and the like. Services may be referred to as use cases, communication types, and the like.

Note that the DCI (PDSCH) corresponding to the specific service may correspond to (PDSCH scheduled by) DCI in which the cyclic redundancy check (CRC) is scrambled using the specific RNTI.

The PDSCH corresponding to the specific service may correspond to the PDSCH that is received and processed (demodulation, decoding, and the like) based on a specific modulation and coding scheme (MCS) table. The specific MCS table may be an MCS table for new 64 quadrature amplitude modulation (QAM), and the table used for the PDSCH may be configured in the UE by the higher layer signaling (for example, by configuring the RRC parameter "mcs-Table" to "qam64LowSE").

The UE may assume that HARQ-ACK can be bundled in one or a plurality of repetitions. In other words, the UE may apply the HARQ-ACK bundling to maintain the codebook size and the PUCCH format during the PUCCH repetition.

Figure 8:
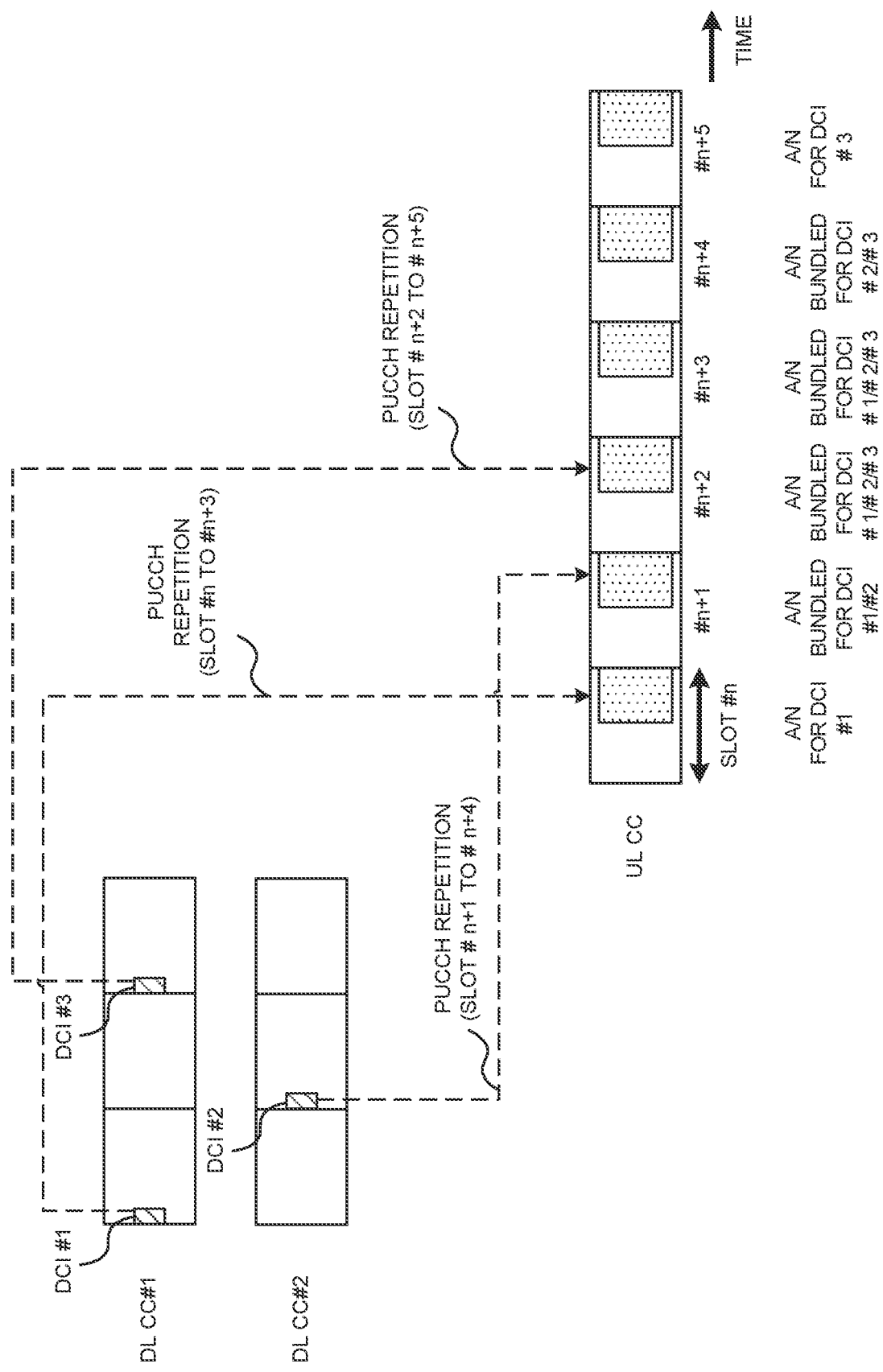
FIG. 8 is a diagram illustrating a fourth example of the PUCCH repetition in the third embodiment.

FIG. 8 is a diagram illustrating a fourth example of the PUCCH repetition in the third embodiment. In this example, the codebook size (the number of HARQ-ACK bits corresponding to DCI) is maintained to be the same in each slot during the PUCCH repetition. This example differs from the example in FIG. 4 in that the UE does not detect DCI #4.

The UE may transmit the following HARQ-ACKs in slots #n to #n+5, respectively:
  Slot #n: A/N for DCI #1
  Slot #n+1: A/N bundled for DCIs #1 and #2
  Slot #n+2: A/N bundled for DCIs #1, #2, and #3
  Slot #n+3: A/N bundled for DCIs #1, #2, and #3
  Slot #n+4: A/N bundled for DCIs #2 and #3
  Slot #n+5: A/N for DCI #3

That is, when there are the A/Ns for the plurality of PUCCH repetitions in the same slot, the UE may transmit an A/N to which bundling (logical product operation) is applied to all or some of the A/Ns for the plurality of PUCCH repetitions.

The UE may assume that it transmits HARQ-ACKs that do not exceed a given number in one or a plurality of repetitions. In other words, the UE may assume that at least one of the codebook size and the PUCCH format changes during the PUCCH repetition. The above given number (in other words, the maximum value of the codebook size) may be configured by the higher layer signaling or may be specified by the specification.

Figure 9:
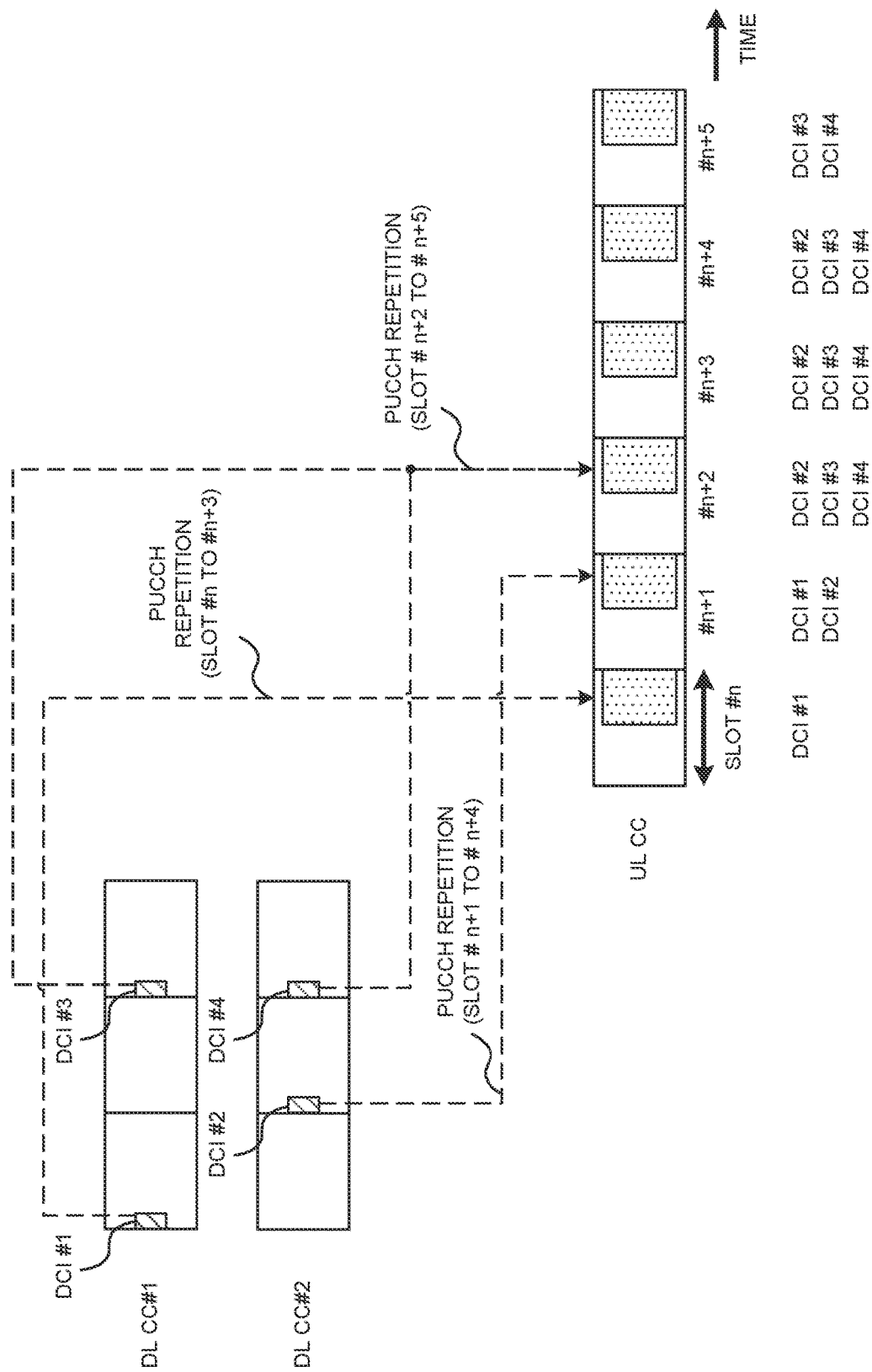
FIG. 9 is a diagram illustrating a fifth example of the PUCCH repetition in the third embodiment.

FIG. 9 is a diagram illustrating a fifth example of the PUCCH repetition in the third embodiment. In this example, it is allowed (or assumed) that the codebook size (the number of HARQ-ACK bits corresponding to DCI) is different in each slot during the PUCCH repetition. Note that it is assumed that the maximum value of the codebook size used for the PUCCH repetition is configured or defined as 3.

The UE may transmit the following HARQ-ACKs in slots #n to #n+5, respectively:
  Slot #n: DCI #1
  Slot #n+1: DCIs #1 and #2
  Slot #n+2: DCIs #2, #3, and #4
  Slot #n+3: DCIs #2, #3, and #4
  Slot #n+4: DCIs #2, #3, and #4
  Slot #n+5: DCIs #3 and #4

Compared to the example in FIG. 5 where there was no limit on the codebook size, this example differs in that the A/Ns for later DCIs #2 to #4 among the DCIs #1 to #4 are transmitted in slots #n+3 and #n+4.

Note that the determination policy, pattern, and the like of the A/N described in the third embodiment may be used in combination.

In addition, when the PUCCH repetition is configured, the UE may assume that the base station schedules one or both of the codebook size and/or the PUCCH format to be the same (unchanged or maintained) within the PUCCH repetition, even if the dynamic HARQ-ACK codebook is configured.

When the base station configures a PUCCH repetition and a dynamic HARQ-ACK codebook for UE, the base station may schedule one or both of the codebook size and the PUCCH format to be the same (unchanged or maintained) within the PUCCH repetition of the UE.

For example, the base station may control scheduling (for example, transmission timing) of at least one of DCI and PDSCH so that the UE performs the PUCCH repetition using one PUCCH format for a given period (for example, slot for repetition factor).

The base station may control scheduling (for example, transmission timing) of at least one of DCI and PDSCH so that the UE performs the PUCCH repetition using the codebook that does not exceed the given codebook size for a given period (for example, slot for repetition factor).

According to the third embodiment described above, the UE can select and transmit an appropriate UCI even when the PUCCH repetitions overlap.

Fourth Embodiment

In a fourth embodiment, in a serving cell within one control unit (for example, CG, PUCCH-group), a UE in which a PUCCH repetition is configured may schedule the PDSCH such that the PUCCH repetition is in a symbol in which HARQ-ACKs for different PDSCHs do not overlap in one or a plurality of slots. Note that the UE may report UE capability signaling to the base station using higher layer signaling to notify whether such scheduling is possible.

That is, the UE may assume that the plurality of PUCCH repetition periods overlap, while the resources for each PUCCH repetition do not overlap in time.

Figure 10:
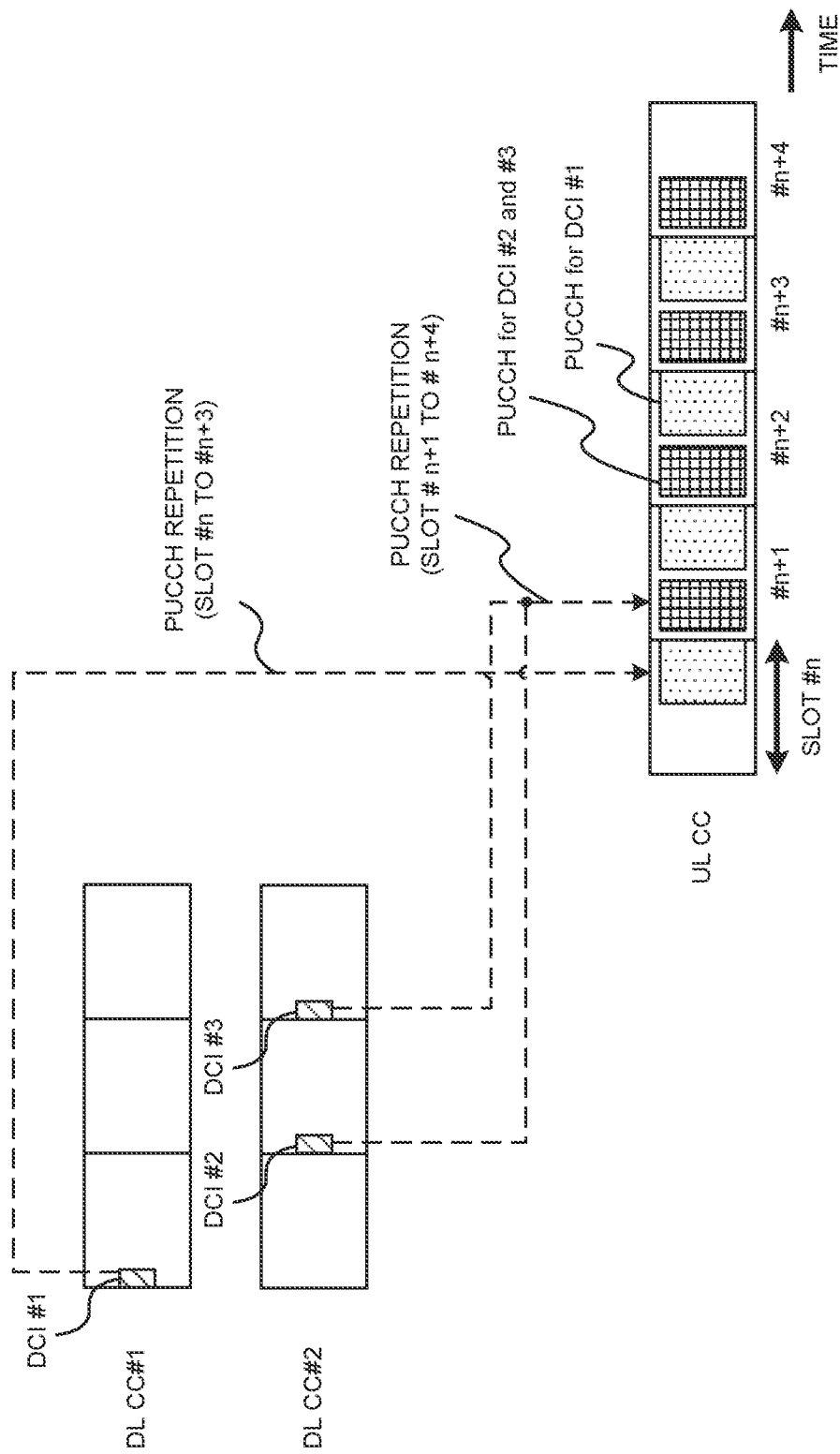
FIG. 10 is a diagram illustrating an example of PUCCH repetition in a fourth embodiment.

FIG. 10 is a diagram illustrating an example of PUCCH repetition in a fourth embodiment. This example differs from the example in FIG. 4 in that the UE detects DCI #3 indicating PUCCH repetition of UL CC slots #n+1 to #n+4 in DL CC #2 without receiving DCI #3 in DL CC #1.

In this example, the UE initiates the PUCCH repetition from slot #n to #n+3 based on DCI #1. In addition, the UE also initiates the PUCCH repetition from slots #n+1 to #n+4 based on DCIs #2 and #3.

Since the PUCCH resource for transmitting the A/N for DCI #1 is different from the PUCCH resource for transmitting the A/Ns for DCIs #2 and #3, the codebook size and the PUCCH format for these PUCCH repetitions may be determined to be different. Note that the UE may determine the PUCCH resource for transmitting the A/N for DCI based on at least one of the DCI and the higher layer signaling (for example, RRC signaling).

According to the fourth embodiment described above, the UE can transmit the UCI using different PUCCH resources even when the PUCCH repetition periods overlap.

Fifth Embodiment

In a fifth embodiment, a UE in which PUCCH repetition is configured may be assumed to have the following restrictions due to the PUCCH repetition:

The UE does not repeat, in slot n, HARQ-ACK transmission corresponding to PDSCH transmission in slot {x} ({x} corresponds to a slot (or slot group) before slot n−K1), The UE transmits only the HARQ-ACK response corresponding to the PDSCH detected in slot n−K1 from slot n to n+$N_{ANRep}$−1.

The UE does not transmit other signals/channels from slot n to n+$N_{ANRep}$−1,

The UE does not perform repetitive transmission of a HARQ-ACK response corresponding to the PDSCH transmission detected in slot n−K1+1 to n+$N_{ANRep}$−K1−1.

Here, $N_{ANRep}$ corresponds to the PUCCH repetition factor.

The UE may assume that the base station scheduler limits the second PDCCH (DCI), which is earlier than the first DCI, such that the PUCCH repetition based on the first DCI overlaps another PUCCH repetition. In addition, the UE may assume that the base station scheduler limits the HARQ-ACK feedback for the third PDCCH (DCI), which is later than the first DCI, such that the PUCCH repetition based on the first DCI overlaps another PUCCH repetition.

In other words, when receiving the first DCI, the UE may assume that at least one of the second DCI and the third DCI is not received (not transmitted from the base station). When transmitting the first DCI to the UE, the base station (base station scheduler) may control not to transmit at least one of the second DCI and the third DCI to the UE.

According to the fifth embodiment described above, the overlapping of the PUCCH repetition can be suppressed, and the complexity of the UE processing can be suppressed.

<Others>

The generation of HARQ-ACK, the transmission of HARQ-ACK, the determination of HARQ-ACK, and the identification of HARQ-ACK in the present disclosure may be read interchangeably with each other. In addition, the HARQ-ACK, ACK, NACK, A/N, HARQ-ACK bits, and the like in the present disclosure may be read interchangeably with each other. In addition, the HARQ-ACK may be read as any UCI (for example, SR, CSI) or a combination of UCIs.

The base station may perform the UCI (HARQ-ACK) reception processing (decoding, and the like) assuming the UE operation of each of the above-described embodiments, or may perform the scheduling such as PDSCH and DCI on the UE.

(Radio Communication System)

Now, the structure of a radio communication system according to one embodiment of the present disclosure will be described below. In this radio communication system, communication is performed using one or a combination of the radio communication methods according to the herein-contained embodiments of the present disclosure.

Figure 11:
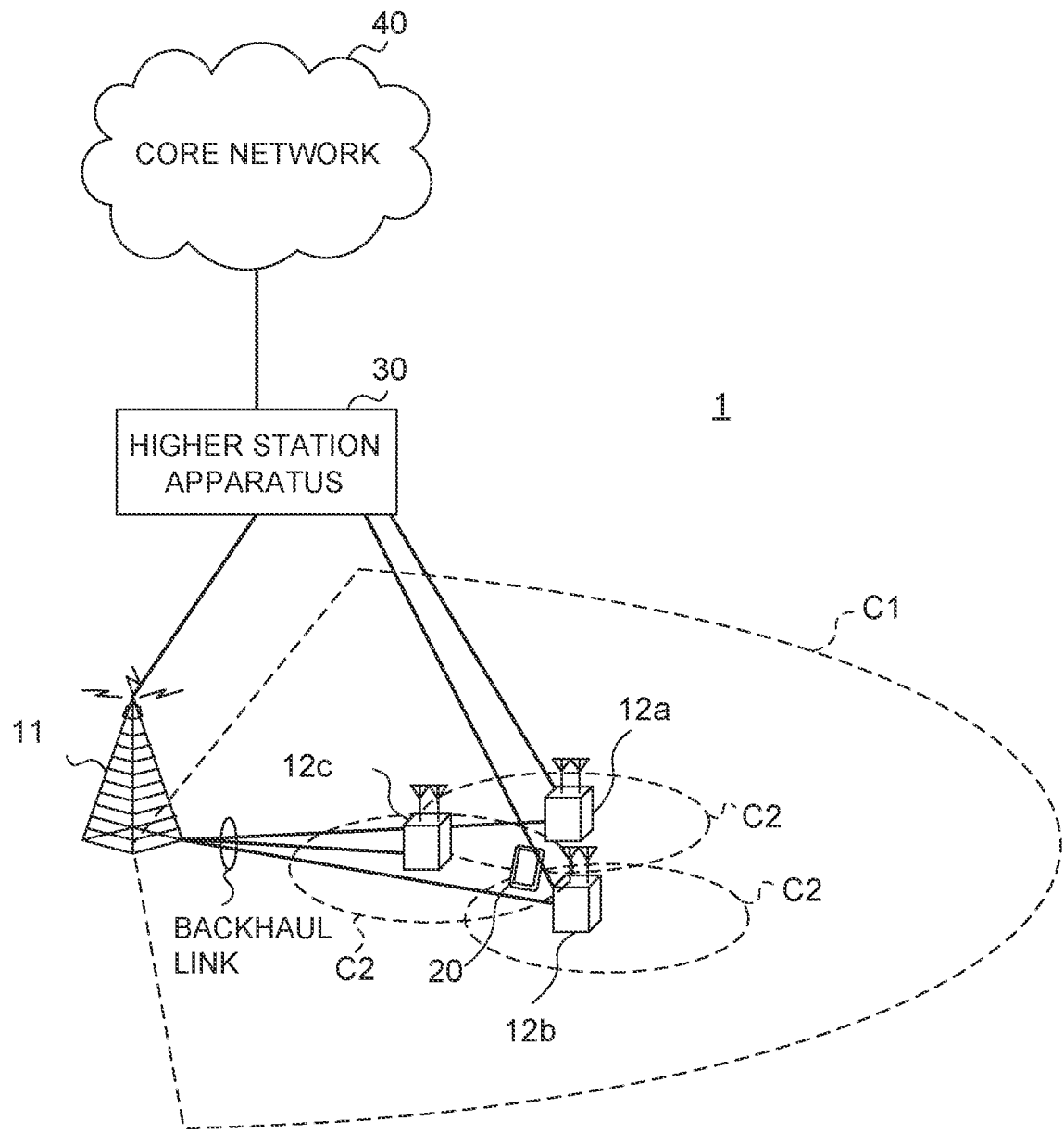
FIG. 11 is a diagram illustrating an example of a schematic configuration of a radio communication system according to an embodiment.

FIG. 11 is a diagram illustrating an example of a schematic configuration of a radio communication system according to an embodiment. A radio communication system 1 can adopt at least one of carrier aggregation (CA) and/or dual connectivity (DC) to group a plurality of fundamental frequency blocks (component carriers) into one, where the system bandwidth (for example, 20 MHz) constitutes one unit.

Note that the radio communication system 1 may be referred to as "long term evolution (LTE)", "LTE-Advanced (LTE-A)", "LTE-Beyond (LTE-B)", "SUPER 3G", "IMT-Advanced", "4th generation mobile communication system (4G)", "5th generation mobile communication system (5G)", "new radio (NR)", "future radio access (FRA)", "New-radio access technology (RAT)", and the like, or may be seen as a system to implement these.

The radio communication system 1 includes a base station 11 that forms a macro cell C1 covering a relatively wide coverage, and base stations 12 (12a to 12c) that are placed within the macro cell C1 and that form small cells C2, which are narrower than the macro cell C1. Also, user terminals 20 are placed in the macro cell C1 and in each small cell C2. The arrangement, number and the like of cells and user terminals 20 are not limited to those illustrated in the drawings.

The user terminals 20 can connect with both the base station 11 and the base stations 12. The user terminals 20 may use the macro cell C1 and the small cells C2 at the same time by means of CA or DC. Further, the user terminal 20 may apply CA or DC using a plurality of cells (CC).

Between the user terminals 20 and the base station 11, communication can be carried out using a carrier of a relatively low frequency band (for example, 2 GHz) and a narrow bandwidth (referred to as an "existing carrier", a "legacy carrier" and the like). Meanwhile, between the user terminals 20 and the base stations 12, a carrier of a relatively high frequency band (for example, 3.5 GHz, 5 GHz and the like) and a wide bandwidth may be used, or the same carrier as that used in the base station 11 may be used. Note that the structure of the frequency band for use in each base station is by no means limited to these.

Further, the user terminal 20 can perform communication in each cell using at least one of time division duplex (TDD) and frequency division duplex (FDD). Further, in each cell (carrier), a single numerology may be applied, or a plurality of different numerologies may be applied.

The numerology may be a communication parameter that applies to at least one of the transmission and reception of a signal or a channel, and may indicate at least one of, for example, a subcarrier spacing, a bandwidth, a symbol length, a cyclic prefix length, a subframe length, a TTI length, the number of symbols per TTI, a radio frame configuration, specific filtering processing performed by a transceiver in a frequency domain, specific windowing processing performed by a transceiver in a time domain, and the like.

For example, when at least one of the subcarrier spacing and the number of OFDM symbols of the configured OFDM symbols is different for a physical channel, it may be said that the numerology is different.

Wire connection (for example, means in compliance with the common public radio interface (CPRI) such as optical fiber, the X2 interface and the like) or wireless connection is established between the base station 11 and the base station 12 (or between two base stations 12).

The base station 11 and each base station 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and the like, but is by no means limited to these. Also, each base station 12 may be connected with the higher station apparatus 30 via the base station 11.

Note that the base station 11 is a base station having a relatively wide coverage, and may be referred to as a "macro base station", an "aggregate node", an "eNB (eNodeB)", a "transmitting/receiving point" and the like. Also, the base stations 12 are base stations having local coverages, and may be referred to as "small base stations", "micro base stations", "pico base stations", "femto base stations", "Home eNodeB (HeNB)", "remote radio head (RRH)", "transmitting/receiving points" and the like. Hereinafter, the base stations 11 and 12 will be collectively referred to as a base station 10 unless specified otherwise.

Each user terminal 20 are terminals to support various communication schemes such as LTE, LTE-A, NR, and the like, and may be either mobile communication terminals (mobile stations) or stationary communication terminals (fixed stations).

In the radio communication system 1, as radio access schemes, orthogonal frequency division multiple access (OFDMA) is applied to the downlink, and at least one of single carrier frequency division multiple access (SC-FDMA) and OFDMA is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and other radio access schemes can be used as well.

In the radio communication system 1, a downlink shared channel (physical downlink shared channel (PDSCH)), which is used by each user terminal 20 on a shared basis, a broadcast channel (physical broadcast channel (PBCH)), downlink control channels and the like are used as downlink channels. User data, higher layer control information, system information block (SIB), and the like are transmitted in the PDSCH. Also, the master information block (MIB) is transmitted in the PBCH.

The downlink control channels include a physical downlink control channel (PDCCH), an enhanced physical downlink control channel (EPDCCH), a physical control format indicator channel (PCFICH), a physical hybrid-ARQ indicator channel (PHICH), and the like. Downlink control information (DCI), including at least one scheduling information of PDSCH and PUSCH is transmitted by the PDCCH.

Note that the DCI to schedule receipt of DL data may be referred to as "DL assignment", and the DCI to schedule transmission of UL data may be referred to as "UL grant".

The number of OFDM symbols to use for the PDCCH is transmitted by the PCFICH. Hybrid automatic repeat reQuest (HARQ) delivery acknowledgment information (also referred to as, for example, "retransmission control information", "HARQ-ACKs", "ACK/NACKs", and the like) in response to the PUSCH is transmitted by the PHICH. The EPDCCH is frequency-division-multiplexed with the PDSCH (downlink shared data channel) and used to communicate DCI and the like, like the PDCCH.

In the radio communication system 1, an uplink shared channel (physical uplink shared channel (PUSCH)), which is used by each user terminal 20 on a shared basis, an uplink control channel (physical uplink control channel (PUCCH)), a random access channel (physical random access channel (PRACH)) and the like are used as uplink channels. User data, higher layer control information and the like are transmitted by the PUSCH. Also, in the PUCCH, downlink radio quality information (channel quality indicator (CQI)), delivery acknowledgment information, scheduling requests (SRs), and the like are transmitted. By means of the PRACH, random access preambles for establishing connections with cells are transmitted.

In the radio communication system 1, cell-specific reference signal (CRSs), channel state information reference signal (CSI-RSs), demodulation reference signal (DMRSs), positioning reference signal (PRSs), and the like are transmitted as downlink reference signals. Also, in the radio communication system 1, a measurement reference signal (sounding reference signal (SRS)), a demodulation reference signal (DMRSs), and the like are transmitted as uplink reference signals. Note that, DMRSs may be referred to as "user terminal-specific reference signals (UE-specific Reference Signals)". Also, the reference signals to be transmitted are by no means limited to these.

(Base Station)

Figure 12:
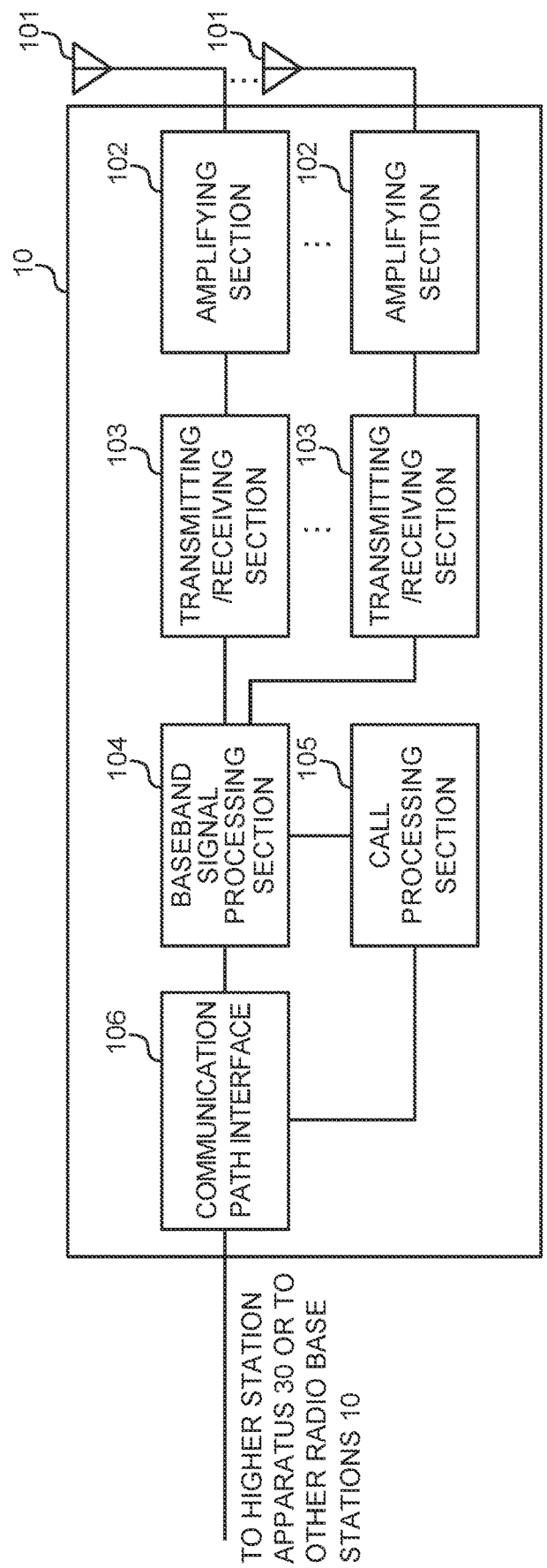
FIG. 12 is a diagram illustrating an example of an overall configuration of a base station according to an embodiment.

FIG. 12 is a diagram illustrating an example of an overall configuration of a base station according to an embodiment. A base station 10 has a plurality of transmitting/receiving antennas 101, amplifying sections 102, transmitting/receiving sections 103, a baseband signal processing section 104, a call processing section 105 and a communication path interface 106. Note that the transmitting/receiving antennas 101, the amplifying sections 102, and the transmitting/receiving sections 103 may be provided.

User data to be transmitted from the base station 10 to a user terminal 20 on the downlink is input from the higher station apparatus 30 to the baseband signal processing section 104, via the communication path interface 106.

In the baseband signal processing section 104, the user data is subjected to transmission processes, including a packet data convergence protocol (PDCP) layer process, division and coupling of the user data, radio link control (RLC) layer transmission processes such as RLC retransmission control, medium access control (MAC) retransmission control (for example, a hybrid automatic repeat reQuest (HARQ) transmission process), scheduling, transmission format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present disclosure pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as configuration and releasing communication channels), manages the state of the base stations 10 and manages the radio resources.

The communication path interface 106 transmits and receives signals to and from the higher station apparatus 30 via a given interface. Also, the communication path interface 106 may transmit and receive signals (backhaul signaling) with other base stations 10 via an inter-base station interface (which is, for example, optical fiber that is in compliance with the common public radio interface (CPRI), the X2 interface, and the like).

Figure 13:
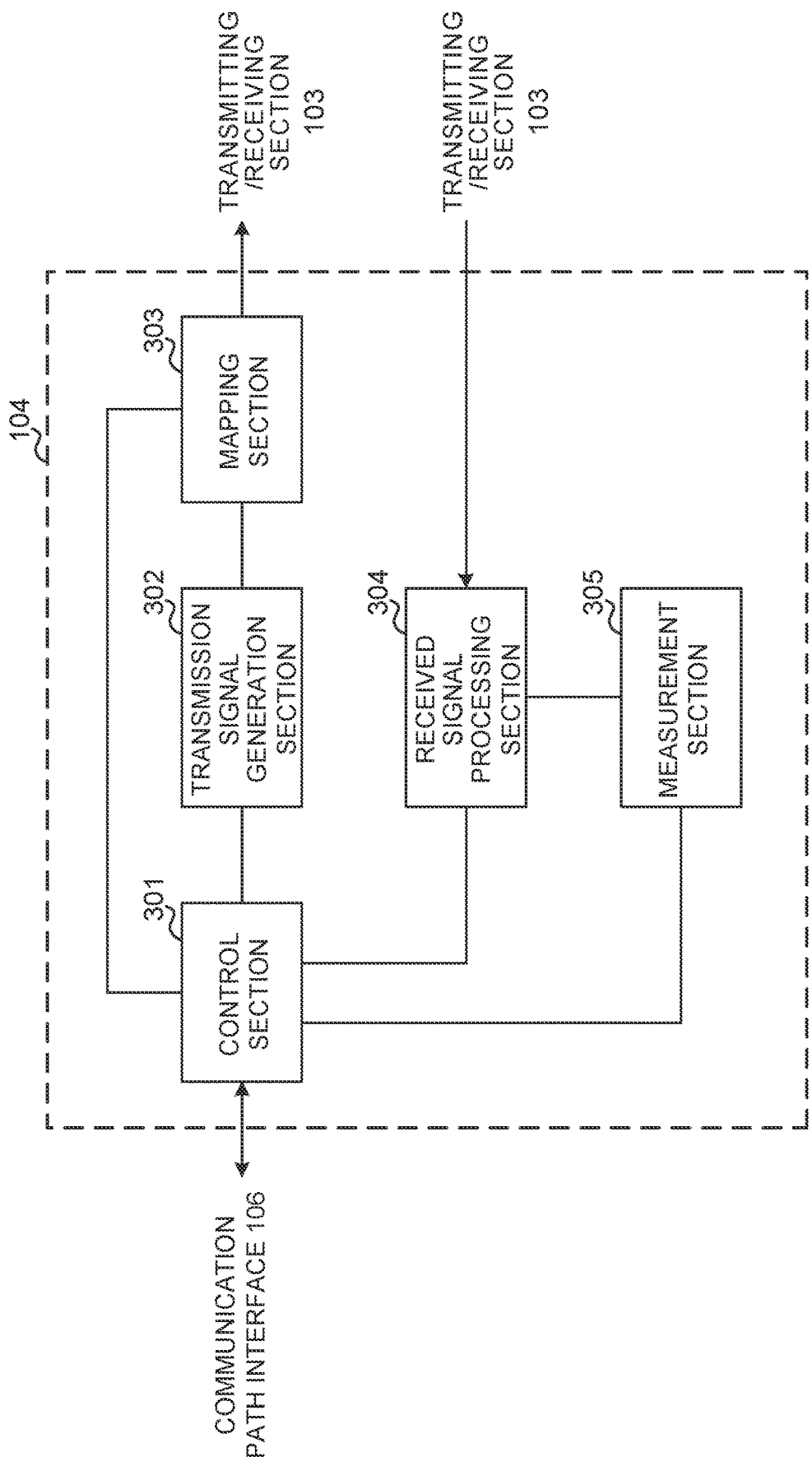
FIG. 13 is a diagram illustrating an example of a function configuration of the base station according to the embodiment.

FIG. 13 is a diagram illustrating an example of a function configuration of a base station according to an embodiment. Note that, although this example will primarily show functional blocks that pertain to characteristic parts of the present embodiment, the base station 10 has other functional blocks that are necessary for radio communication as well.

The baseband signal processing section 104 at least has a control section (scheduler) 301, a transmission signal generation section 302, a mapping section 303, a received signal processing section 304, and a measurement section 305. Note that these configurations have only to be included in the base station 10, and some or all of these configurations may not be included in the baseband signal processing section 104.

The control section (scheduler) 301 controls the whole of the base station 10. The control section 301 can be constituted by a controller, a control circuit, or control apparatus that can be described based on general understanding of the technical field to which the present disclosure pertains.

The control section 301, for example, controls the generation of signals in the transmission signal generation section 302, the allocation of signals by the mapping section 303, and the like. Furthermore, the control section 301 controls the signal receiving processes in the received signal processing section 304, the measurements of signals in the measurement section 305, and the like.

The control section 301 controls scheduling (for example, resource allocation) of system information, downlink data signals (for example, signals transmitted using the downlink shared channel), and downlink control signals (for example, signals transmitted using the downlink control channel). In addition, the control section 301 controls the generation of downlink control signals, downlink data signals, and the like, based on the results of deciding whether or not retransmission control is necessary for uplink data signals, and the like.

The control section 301 controls the scheduling of synchronization signals (for example, the primary synchronization signal (PSS)/secondary synchronization signal (SSS)), downlink reference signals (for example, the CRS, the CSI-RS, the DM-RS, and the like) and the like.

The control section 301 controls scheduling of uplink data signals (for example, signals transmitted using the uplink shared channel), uplink control signals (for example, signals transmitted using the uplink control channel), random access preamble, uplink reference signals, and the like.

The transmission signal generation section 302 generates a downlink signal (downlink control signal, downlink data signal, downlink reference signal, and the like) based on the instruction from the control section 301, and outputs the downlink signal to the mapping section 303. The transmission signal generation section 302 can be constituted by a signal generator, a signal generation circuit, or a signal generation apparatus that can be described based on general understanding of the technical field to which the present disclosure pertains.

The transmission signal generation section 302 generates, for example, based on the instruction from the control section 301, at least one of the DL assignment that notifies the downlink data allocation information and the UL grant that notifies the uplink data allocation information. Both the DL assignment and the UL grant are DCI and follow the DCI format. In addition, the downlink data signal is coded and modulated according to the coding rate, modulation method, and the like that are determined based on the channel state information (CSI) from each user terminal 20.

Based on the instruction from the control section 301, the mapping section 303 maps the downlink signal generated by the transmission signal generation section 302 to a given radio resource and outputs the mapped downlink signal to the transmitting/receiving sections 103. The mapping section 303 can be constituted by a mapper, a mapping circuit, or a mapping apparatus that can be described based on general understanding of the technical field to which the present disclosure pertains.

The received signal processing section 304 performs reception processing (for example, demapping, demodulation, decoding, and the like) on the received signal input from the transmitting/receiving sections 103. Here, the received signal is, for example, an uplink signal (uplink control signal, uplink data signal, uplink reference signal, and the like) transmitted from the user terminal 20. The received signal processing section 304 can be constituted by a signal processor, a signal processing circuit, or a signal processing apparatus that can be described based on general understanding of the technical field to which the present disclosure pertains.

The received signal processing section 304 outputs the information decoded by the reception processing to the control section 301. For example, when a PUCCH including HARQ-ACK is received, the HARQ-ACK is output to the control section 301. Further, the received signal processing section 304 outputs at least one of the received signal and the signal after the reception processing to the measurement section 305.

The measurement section 305 performs measurements on the received signal. The measurement section 305 can be constituted by a measurer, a measurement circuit, or a measurement apparatus that can be described based on general understanding of the technical field to which the present disclosure pertains.

For example, the measurement section 305 may perform radio resource management (RRM) measurement, channel state information (CSI) measurement, or the like based on the received signal. The measurement section 305 may measure received power (for example, reference signal received rower (RSRP)), reception quality (for example, reference signal received quality (RSRQ), a signal to interference plus noise ratio (SINR), a signal to noise ratio (SNR)), signal strength (for example, received signal strength indicator (RRSI)), propagation path information (for example, CSI), and the like. The measurement result may be output to the control section 301.

The transmitting/receiving sections 103 may transmit configuration information for configuring the PUCCH repetition and the dynamic HARQ-ACK codebook to the user terminal 20. Note that the configuration information of the PUCCH repetition and the configuration information of the dynamic HARQ-ACK codebook may be transmitted as separate information (for example, separate RRC parameters) or may be transmitted as one piece of information.

The control section 301 may control the scheduling of at least one of the downlink control information (DCI) and the downlink shared channel (PDSCH) for the user terminal 20 such that the user terminal 20 that has received the above configuration information in a given period (for example, a slot for the repetition factor) uses a codebook that does not exceed the given codebook size to perform the PUCCH repetition.

The transmitting/receiving sections 103 may transmit information regarding the given codebook size (maximum codebook size of PUCCH repetition) to the user terminal 20.

(User Terminal)

Figure 14:
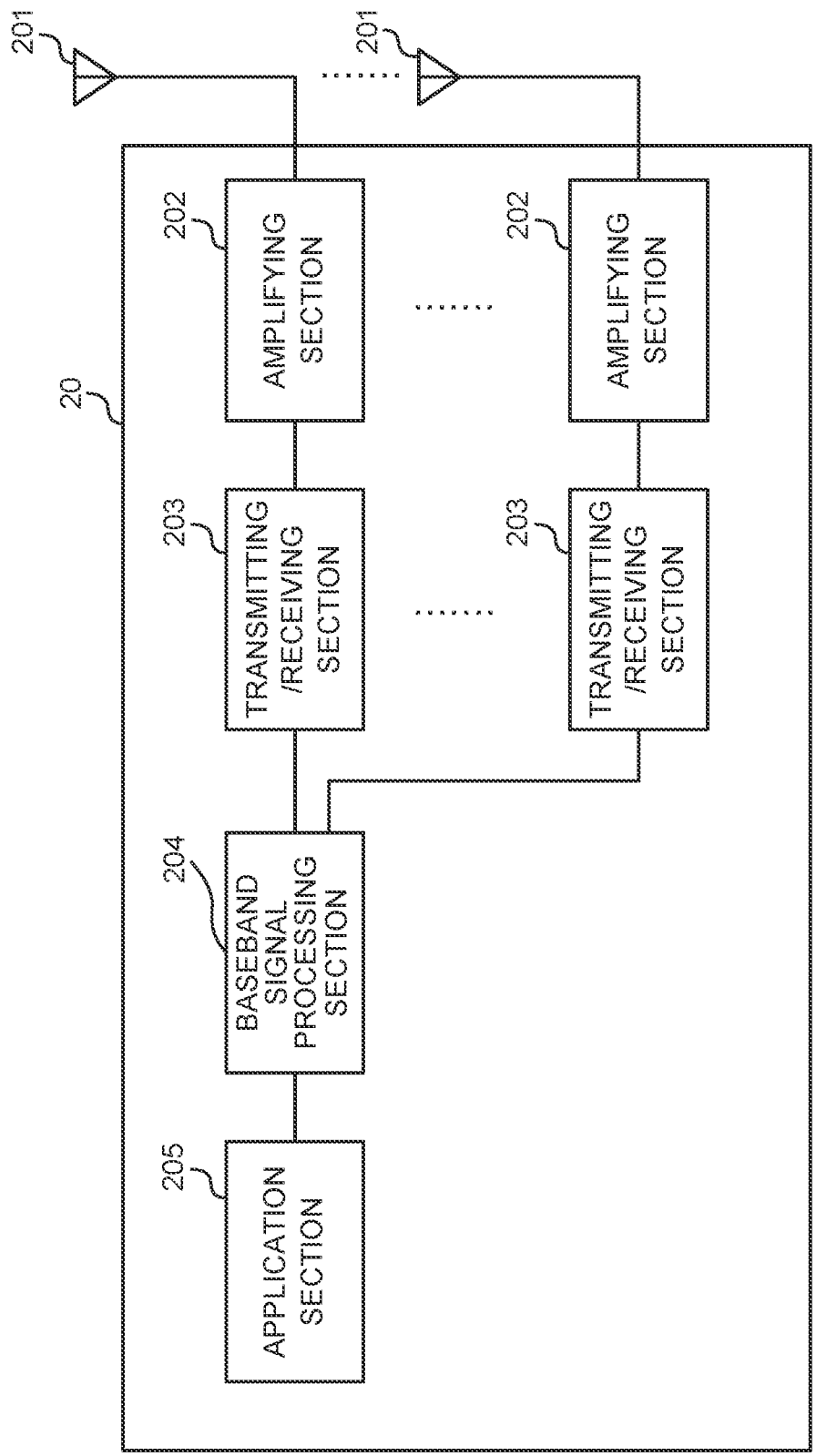
FIG. 14 is a diagram illustrating an example of an overall configuration of a user terminal according to an embodiment.

FIG. 14 is a diagram illustrating an example of an overall configuration of a user terminal according to an embodiment. A user terminal 20 has a plurality of transmitting/receiving antennas 201, amplifying sections 202, transmitting/receiving sections 203, a baseband signal processing section 204, and an application section 205. Note that the transmitting/receiving antennas 201, the amplifying sections 202, and the transmitting/receiving sections 203 may be provided.

The radio frequency signal received by the transmitting/receiving antennas 201 is amplified by the amplifying sections 202. The transmitting/receiving sections 203 receive the downlink signals amplified in the amplifying sections 202. The received signals are converted into the baseband signal through frequency conversion in the transmitting/receiving sections 203 and output to the baseband signal processing section 204. The transmitting/receiving sections 203 can be constituted by transmitters/receivers, transmitting/receiving circuits or transmitting/receiving apparatus that can be described based on general understanding of the technical field to which the present disclosure pertains. Note that the transmitting/receiving sections 203 may be structured as transmitting/receiving sections in one entity, or may be constituted by a transmitting section and a receiving section.

The baseband signal processing section 204 performs FFT processing, error correction decoding, retransmission control reception processing, and the like on the input baseband signal. The downlink user data is transmitted to the application section 205. The application section 205 performs processing related to layers higher than the physical layer and the MAC layer. In addition, the broadcast information of the downlink data may also be transmitted to the application section 205.

On the other hand, the uplink user data is input from the application section 205 to the baseband signal processing section 204. In the baseband signal processing section 204, retransmission control transmission processing (for example, HARQ transmission processing), channel coding, precoding, discrete Fourier transform (DFT) processing, IFFT processing, and the like are performed and the baseband signals are transmitted to the transmitting/receiving sections 203.

The baseband signals that are output from the baseband signal processing section 204 are converted into a radio frequency band in the transmitting/receiving section 203, and then transmitted. The radio frequency signals having been subjected to frequency conversion in the transmitting/receiving sections 203 are amplified in the amplifying sections 202, and transmitted from the transmitting/receiving antennas 201.

Figure 15:
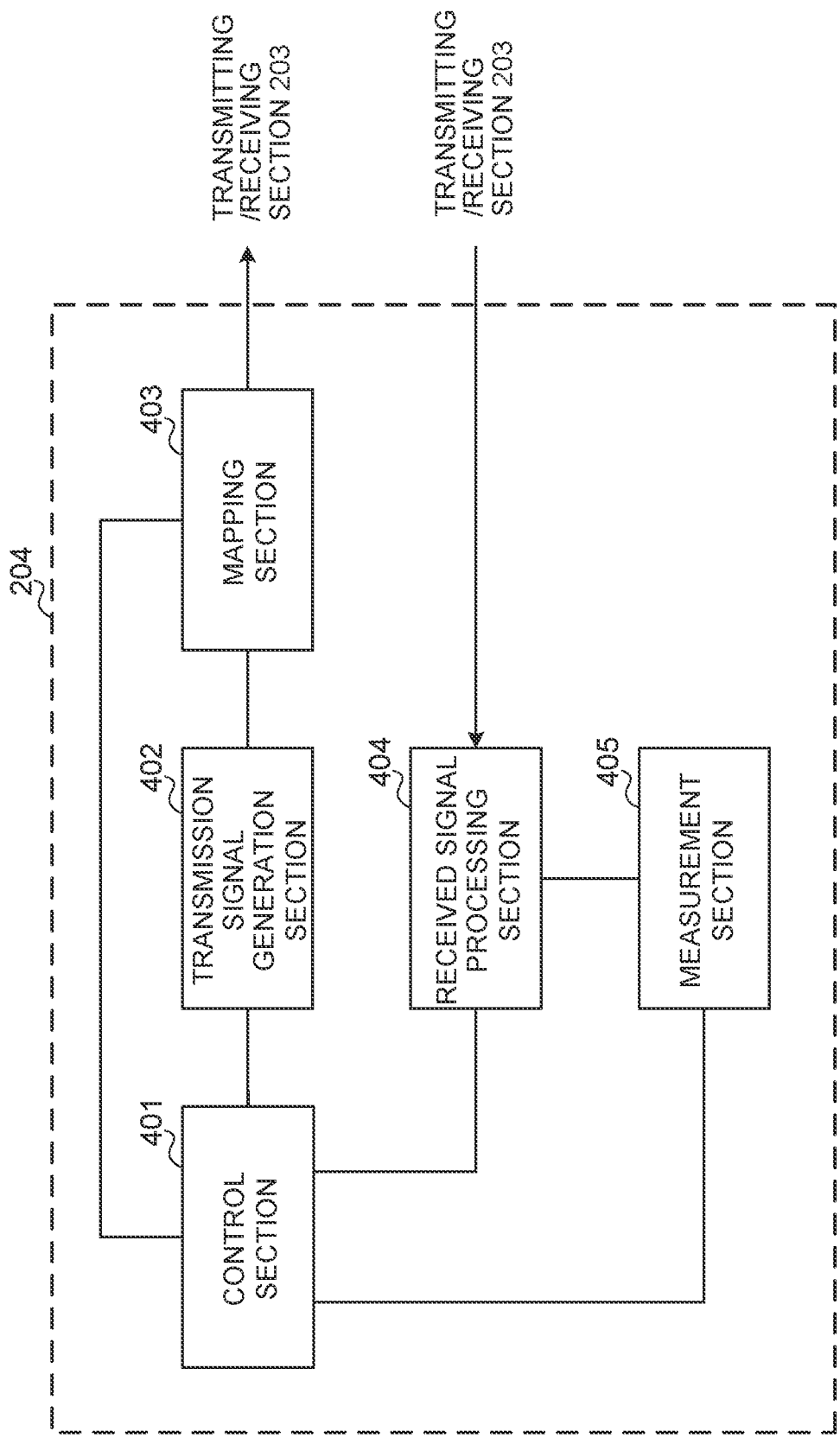
FIG. 15 is a diagram illustrating an example of a function configuration of the user terminal according to the embodiment.

FIG. 15 is a diagram illustrating an example of a function configuration of the user terminal according to an embodiment. Note that, although this example will primarily show functional blocks that pertain to characteristic parts of the present embodiment, it may be considered that the user terminal 20 has other functional blocks that are necessary for radio communication as well.

The baseband signal processing section 204 included in the user terminal 20 at least has a control section 401, a transmission signal generation section 402, a mapping section 403, a received signal processing section 404, and a measurement section 405. Note that these configurations have only to be included in the user terminal 20, and some or all of these configurations may not be included in the baseband signal processing section 204.

The control section 401 controls the whole of the user terminal 20. The control section 401 can be constituted by a controller, a control circuit, or control apparatus that can be described based on general understanding of the technical field to which the present disclosure pertains.

The control section 401, for example, controls the generation of signals in the transmission signal generation section 402, the allocation of signals by the mapping section 403, and the like. Furthermore, the control section 401 controls the signal receiving processes in the received signal processing section 404, the measurements of signals in the measurement section 405, and the like.

The control section 401 acquires, from the received signal processing section 404, the downlink control signal, the downlink data signal, and the like transmitted from the base station 10. The control section 401 controls the generation of the uplink control signal, the uplink data signal, and the like based on the downlink control signals, as a result of determining whether or not retransmission control is necessary for downlink data signals, and the like.

When the control section 401 acquires various types of information notified from the base station 10 from the received signal processing section 404, the control section 401 may update the parameters used for control based on the information.

The transmission signal generation section 402 generates an uplink signal (uplink control signal, uplink data signal, uplink reference signal, and the like) based on the instruction from the control section 401, and outputs the uplink signal to the mapping section 403. The transmission signal generation section 402 can be constituted by a signal generator, a signal generation circuit, or a signal generation apparatus that can be described based on general understanding of the technical field to which the present disclosure pertains.

The transmission signal generation section 402 generates an uplink control signal regarding delivery confirmation information, channel state information (CSI), and the like, for example, based on an instruction from the control section 401. Further, the transmission signal generation section 402 generates an uplink data signal based on an instruction from the control section 401. For example, the transmission signal generation section 402 is instructed by the control section 401 to generate an uplink data signal when the downlink control signal notified from the base station 10 includes a UL grant.

Based on the instruction from the control section 401, the mapping section 403 maps the uplink signal generated by the transmission signal generation section 402 to a radio resource and outputs the mapped uplink signal to the transmitting/receiving sections 203. The mapping section 403 can be constituted by a mapper, a mapping circuit, or a mapping apparatus that can be described based on general understanding of the technical field to which the present disclosure pertains.

The received signal processing section 404 performs reception processing (for example, demapping, demodulation, decoding, and the like) on the received signal input from the transmitting/receiving sections 203. Here, the received signal is, for example, a downlink signal (downlink control signal, downlink data signal, downlink reference signal, and the like) transmitted from the base station 10. The received signal processing section 404 can be constituted by a signal processor, a signal processing circuit, or a signal processing apparatus that can be described based on general understanding of the technical field to which the present disclosure pertains. Further, the received signal processing section 404 can configure a receiving section according to the present disclosure.

The received signal processing section 404 outputs the information decoded by the reception processing to the control section 401. The received signal processing section 404 outputs, for example, broadcast information, system information, RRC signaling, DCI, and the like to the control section 401. Further, the received signal processing section 404 outputs at least one of the received signal and the signal after the reception processing to the measurement section 405.

The measurement section 405 performs measurements on the received signal. The measurement section 405 can be constituted by a measurer, a measurement circuit, or a measurement apparatus that can be described based on general understanding of the technical field to which the present disclosure pertains.

For example, the measurement section 405 may perform RRM measurement, CSI measurement, and the like based on the received signal. The measurement section 405 may measure received power (for example, RSRP), received quality (for example, RSRQ, SINR, SNR), signal strength (for example, RSSI), propagation path information (for example, CSI), and the like. The measurement result may be output to the control section 401.

Note that the control section 401 may determine, when the uplink control channel (PUCCH) repetition (PUCCH repetition) and dynamic HARQ-ACK codebook are configured, one or both of the codebook (for example, codebook size) and the PUCCH format for PUCCH transmission per slot, based on at least one of T-DAI, C-DAI, the timing (K1) from reception of a downlink shared channel (PDSCH) to the transmission of the HARQ-ACK corresponding to the PDSCH and the repetition factor.

The transmitting/receiving sections 203 may apply the PUCCH repetition to HARQ-ACK based on one or both of the above codebook and PUCCH format and transmit the HARQ-ACK.

During the PUCCH repetition, the control section 401 may allow (or assume) fluctuations in the size of the above codebook within a range not exceeding a given value. In addition, "during PUCCH repetition" in the present disclosure may be read as "period in which plurality of PUCCH repetition overlaps".

The control section 401 may control to drop the HARQ-ACK for the previous PDSCH and transmit the HARQ-ACK for the later PDSCH in the slot during the PUCCH repetition. The control section 401 may determine the HARQ-ACK to be transmitted so that the codebook size is smaller than the given codebook size.

The control section 401 may keep the size of the above codebook the same (despite the fact that the dynamic HARQ-ACK codebook is configured) during the PUCCH repetition.

The transmitting/receiving sections 203 may transmit a plurality of PUCCH repetitions using temporally non-overlapping resources (for example, temporally different symbols) in one slot.

The control section 401 may perform the transmission/reception processing on the assumption that the scheduling of at least one of the downlink control information (DCI) and the downlink shared channel (PDSCH) is controlled by the base station 10 such that the PUCCH repetition is performed using one PUCCH format or a codebook that does not exceed the given codebook size in the given period (for example, a slot for the repetition factor).

(Hardware Structure)

Note that the block diagrams used in the description of the above-described embodiments show blocks of functional units. Those functional blocks (structural components) can be realized by a desired combination of at least one of hardware and software. In addition, a method for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Here, functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) that causes transmitting may be called a transmitting unit or a transmitter. For any of the above, as explained above, the realization method is not particularly limited to any one method.

Figure 16:
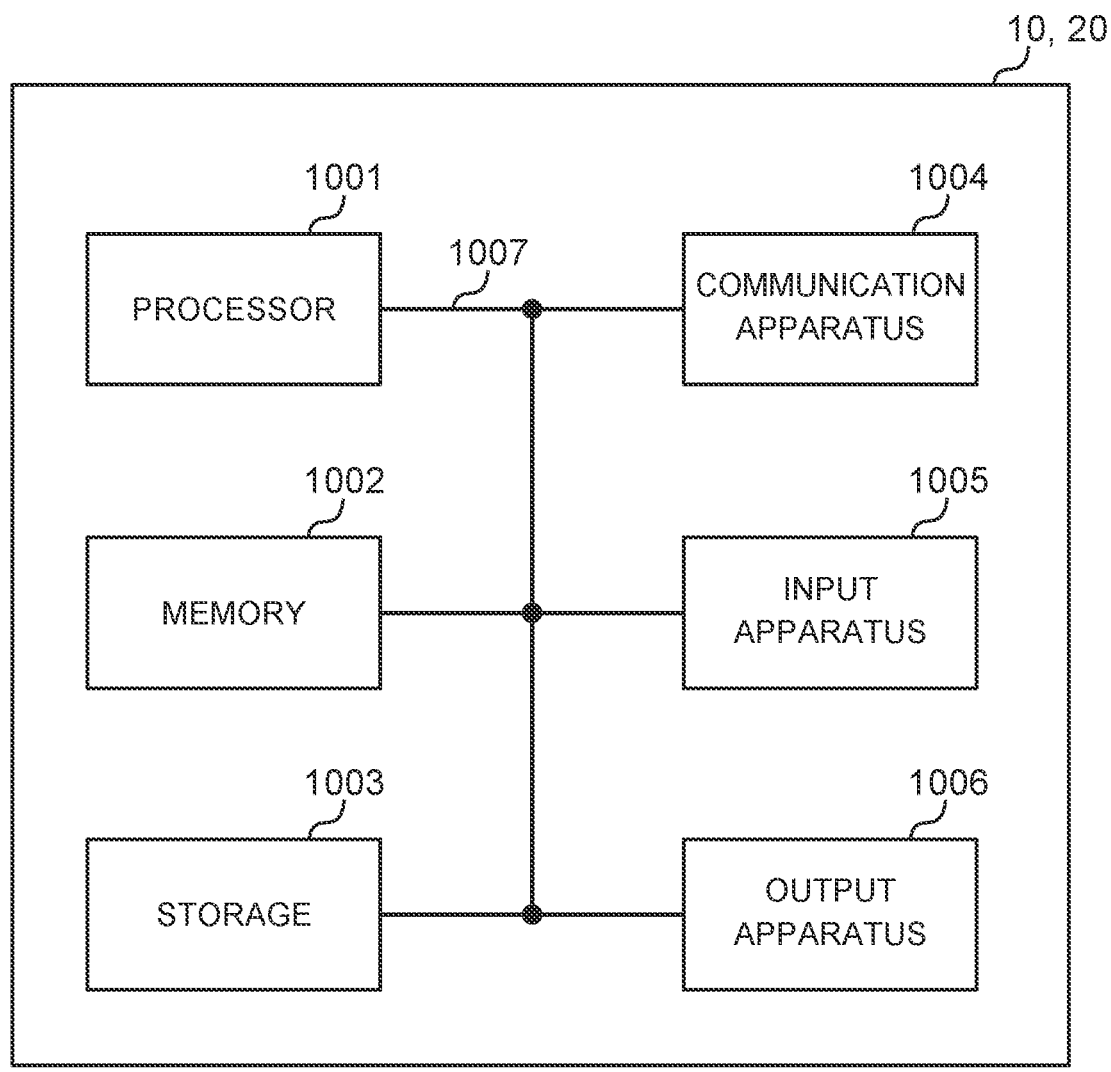
FIG. 16 is a diagram illustrating an example of a hardware structure of the base station and the user terminal according to the embodiment.

For example, the base station, the user terminal, and the like in one embodiment of the present disclosure may function as a computer that performs the processing of the radio communication method of the present disclosure. FIG. 16 is a diagram illustrating an example of a hardware structure of the base station and the user terminal according to the embodiment. The above-described base station 10 and user terminal 20 can be physically configured as a computer device including a processor 1001, a memory 1002, a storage 1003, a communication device 1004, an input device 1005, an output device 1006, a bus 1007, and the like.

Note that in the following explanation, the term "device" can be replaced with a circuit, device, unit, and the like. The hardware structure of the base station 10 and the user terminal 20 may be configured to include one or plurality of devices illustrated in the drawings, or may be configured not to include a part of the devices.

For example, only one processor 1001 is illustrated, but there may be a plurality of processors. In addition, the processing may be executed by one processor, or the processing may be executed by two or more processors simultaneously, sequentially, or by using other methods. Note that the processor 1001 can be implemented by using one or more chips.

Each function of the base station 10 and the user terminal 20 causes the processor 1001 to perform computation by reading a given software (computer program) on hardware such as the processor 1001 and the memory 1002, and is implemented by controlling communication via the communication device 1004, and controlling reading and/or writing of data on the memory 1002 and the storage 1003.

The processor 1001, for example, operates an operating system to control the entire computer. The processor 1001 can be configured with a central processing unit (CPU) including an interface with a peripheral equipment, a control device, a computing device, a register, and the like. For example, the above-described baseband signal processing section 104 (204), call processing section 105, and the like may be realized by the processor 1001.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. For example, the control section 401 of the user terminal 20 may be realized by a control program stored in the memory 1002 and operating in the processor 1001, and may be realized in the same manner for other functional blocks.

The memory 1002 is a computer readable recording medium and is constituted, for example, by a read only memory (ROM), an erasable programmable ROM (EPROM), an electrically erasable programmable ROM (EEPROM), a random access memory (RAM), and at least one of other appropriate storage media. The memory 1002 may be called register, cache, main memory (main storage device), and the like. The memory 1002 can store an executable program (program code), a software module, and the like that can execute the radio communication method according to the embodiment of the present disclosure.

The storage 1003 is a computer-readable recording medium, and may be configured by flexible disks, floppy (registered trademark) disks, magneto-optical disks (for example, compact discs (CD-ROM (Compact Disc ROM), and the like), digital versatile disks, and the like Blu-ray (registered trademark) disks), removable disks, hard disk drives, smart cards, flash memory devices (for example, cards, sticks, key drives), magnetic stripes, databases, servers, and at least one of other suitable storage media. The storage 1003 can be called an auxiliary storage device.

The communication device 1004 is hardware (transmission/reception device) capable of performing communication between computers via a wired and/or wireless network. The communication device 1004 is also called, for example, a network device, a network controller, a network card, a communication module, and the like. The communication device 1004 includes a high-frequency switch, a duplexer, a filter, a frequency synthesizer, and the like in order to realize, for example, at least one of Frequency Division Duplex (FDD) and Time Division Duplex (TDD). For example, the above-mentioned transmitting/receiving antennas 101 (201), amplifying section 102 (202), transmitting/receiving sections 103 (203), communication path interface 106, and the like may be realized by the communication device 1004. The transmitting/receiving sections 103 may be implemented by physically or logically separating the transmitting section 103*a* and the receiving section 103*b*.

The input device 1005 is an input device (for example, a keyboard, a mouse, a microphone, a switch, a button, a sensor, and the like) that accepts input from the outside. The output device 1006 is an output device (for example, a display, a speaker, a light emitting diode (LED) lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information thereamong. The bus 1007 can be constituted by a single bus or can be constituted by separate buses between the devices.

Further, the base station 10 and the user terminal 20 are configured to include hardware such as a microprocessor, a digital signal processor (DSP), an application specific integrated circuit (ASIC), a programmable logic device (PLD), and a field programmable gate array (FPGA). Some or all of these functional blocks may be realized by the hardware. For example, the processor 1001 may be implemented by using at least one of these hardware.

Modified Example

Note that the terms described in this disclosure and terms necessary for understanding the present disclosure may be replaced by terms having the same or similar meanings. For example, at least one of a channel and a symbol may be a signal (signaling). Also, a signal may be a message. The reference signal may be abbreviated as Reference Signal (RS) and may be called pilot, a pilot signal, and the like according to applicable standards. Further, a component carrier (CC) may be referred to as a cell, a frequency carrier, a carrier frequency, or the like.

The radio frame may be composed of one or a plurality of periods (frames) in a time domain. Each of one or the plurality of periods (frames) constituting the radio frame may be referred to as a subframe. In addition, the subframe may be composed of one or a plurality of slots in a time domain. The subframe may have a fixed time length (for example, 1 ms) that does not depend on a numerology.

Here, the numerology may be a communication parameter applied to at least one of transmission and reception of a certain signal or channel. The numerology may indicate at least one of, for example, a subcarrier spacing (SCS), a bandwidth, a symbol length, a cyclic prefix length, a transmission time interval (TTI), the number of symbols per TTI, a radio frame configuration, specific filtering processing performed by a transceiver in a frequency domain, a specific windowing processing performed by the transceiver in the time domain, and the like.

The slot may be composed of one or a plurality of symbols (Orthogonal Frequency Division Multiplexing (OFDM) symbols, Single Carrier Frequency Division Multiple Access (SC-FDMA) symbols, or the like) in the time domain. In addition, the slot may be a time unit based on a numerology.

The slot may include a plurality of minislots. Each minislot may be configured with one or a plurality of symbols in the time domain. In addition, the minislot may be referred to as a sub-slot. The minislot may be configured with a smaller number of symbols than that of the slot. A PDSCH (or PUSCH) transmitted in a time unit larger than the minislot may be referred to as PDSCH (or PUSCH) mapping type A. A PDSCH (or PUSCH) transmitted using the minislot may be referred to as PDSCH (or PUSCH) mapping type B.

All of the radio frame, the subframe, the slot, the minislot, and the symbol represent time units at the time of transmitting a signal. The radio frame, the subframe, the slot, the minislot, and the symbol may have different names corresponding thereto, respectively. Note that time units such as a frame, a subframe, a slot, a minislot, and a symbol in the present disclosure may be replaced with each other For example, one subframe may be referred to as a transmission time interval (TTI), a plurality of consecutive subframes may be referred to as a TTI, and one slot or one minislot may be referred to as a TTI. That is, at least one of the subframe and the TTI may be a subframe (1 ms) in the existing LTE, may be a period (for example, one to thirteen symbols) shorter than 1 ms, or may be a period longer than 1 ms. Note that a unit representing the TTI may be referred to as a slot, a minislot, or the like rather than the subframe.

Here, the TTI refers to, for example, a minimum time unit of scheduling in radio communication. For example, in an LTE system, a base station performs scheduling that allocates radio resources (frequency bandwidths, transmission power, and the like, that can be used in each user terminal) to each user terminal in a unit of the TTI. Note that a definition of the TTI is not limited thereto.

The TTI may be a transmission time unit of a channel-encoded data packet (transport block), a code block, a codeword, or the like, or may be a processing unit such as scheduling, link adaptation, or the like. Note that when the TTI is given, a time section (for example, the number of symbols) in which the transport block, the code block, the codeword, or the like is actually mapped may be shorter than the TTI.

Note that in a case where one slot or one minislot is referred to as the TTI, one or more TTIs (that is, one or more slots or one or more minislots) may be a minimum time unit of scheduling. In addition, the number of slots (number of minislots) constituting the minimum time unit of the scheduling may be controlled.

A TTI having a time length of 1 ms may be referred to as a normal TTI (TTI in LTE Rel. 8-12), a long TTI, a normal subframe, a long subframe, a slot, and the like. A TTI shorter than the normal TTI may be referred to as a shortened TTI, a short TTI, a partial or fractional TTI, a shortened subframe, a short subframe, a minislot, a subslot, a slot, and the like.

Note that the long TTI (for example, a normal TTI, a subframe or the like) may be replaced with a TTI having a time length exceeding 1 ms and the short TTI (for example, a shortened TTI or the like) may be replaced with a TTI having a TTI length shorter than that of the long TTI and having a TTI length of 1 ms or more.

A resource block (RB) is a resource allocation unit in the time domain and the frequency domain, and may include one or a plurality of continuous subcarriers in the frequency domain. The number of subcarriers included in the RB may be the same regardless of the numerology, and may be, for example, 12. The number of subcarriers included in the RB may be determined based on the numerology.

In addition, the time domain of the RB may include one or a plurality of symbols, and may have a length of one slot, one minislot, one subframe, or one TTI. One TTI, one subframe, and the like, may each be configured with one or a plurality of resource blocks.

Note that one or a plurality of RBs may be referred to as a physical resource block (Physical RB: PRB), a subcarrier group (SCG), a resource element group (REG), a PRB pair, an RB pair, and the like.

In addition, the resource block may be configured with one or a plurality of resource elements (RE). For example, one RE may be a radio resource area of one subcarrier and one symbol.

A bandwidth part (BWP) (which may be referred to as a partial bandwidth or the like) may represent a subset of contiguous common resource blocks (RBs) for a certain numerology in a certain carrier. Here, the common RB may be specified by an index of RBs based on a common reference point of the carrier. The PRB may be defined in a certain BWP and be numbered within the BWP.

The BWP may include an UL BWP and a DL BWP. For the UE, one or a plurality of BWPs may be configured in one carrier.

At least one of the configured BWPs may be active, and it may not be assumed that the UE transmits and receives a given signal/channel outside the active BWP. Note that a "cell", a "carrier", or the like in the present disclosure may be replaced with the "BWP".

The structures of the radio frame, the subframe, the slot, the minislot, the symbol, and the like, described above are merely examples. For example, a configuration such as the number of subframes included in the radio frame, the number of slots per subframe or radio frame, the number of minislots included in the slot, the number of symbols and RBs included in the slot or the minislot, the number of subcarriers included in the RB, the number of symbols in the TTI, the symbol length, and the cyclic prefix (CP) length can be variously changed.

Furthermore, the information, the parameter, and the like explained in the present disclosure can be represented by an absolute value, can be expressed as a relative value from a given value, or can be represented by corresponding other information. For example, the radio resource can be indicated by a given index.

The name used for the above parameter and the like in the present disclosure is not a restrictive name in any respect. In addition, formulas and the like using these parameters may be different from those explicitly disclosed in the present disclosure. Because the various channels (for example, PUCCH (Physical Uplink Control Channel), PDCCH (Physical Downlink Control Channel), or the like) and information element can be identified by any suitable name, the various names assigned to these various channels and information elements shall not be restricted in any way.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

In addition, information, signals, and the like can be output from the higher layer to the lower layer and from the lower layer to at least one of the higher layers. Information, signals, and the like may be input/output via a plurality of network nodes.

The input/output information, signal, and the like can be stored in a specific location (for example, a memory) or can be managed in a management table. The information, signal, and the like to be input/output can be overwritten, updated, or added. The output information, signal, and the like can be deleted. The input information, signal, and the like can be transmitted to another device.

Notification of information is not limited to that explained in the above aspect/embodiment, and may be performed by using a different method. For example, the notification of information may be performed by physical layer signaling (for example, Downlink Control Information (DCI), Uplink Control Information (UCI)), higher layer signaling (for example, radio resource control (RRC) signaling, broadcast information (master information block (MIB), system information block (SIB), and the like), medium access control (MAC) signaling), other signals, or a combination thereof.

Note that the physical layer signaling may be referred to as L1/L2 (Layer 1/Layer 2) control information (L1/L2 control signal), L1 control information (L1 control signal), and the like. In addition, the RRC signaling may be called RRC message, or can be, for example, RRC Connection Setup message, RRC Connection Reconfiguration message, or the like. Further, the MAC signaling may be notified using, for example, a MAC control element (MAC CE).

In addition, the notification of given information (for example, notification of "being X") may be performed implicitly (for example, by not notifying the given information or by notifying another information.) without being limited to the explicit notification.

The determination may be made by a value (0 or 1) represented by one bit or by a truth value (Boolean) represented by true or false, or by comparison of numerical values (for example, comparison with a given value).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, optical fiber cable, twisted pair, Digital Subscriber Line (DSL), or the like) and a wireless technology (infrared light, microwave, or the like), then at least one of these wired and wireless technologies is included within the definition of the transmission medium.

The terms "system" and "network" used in the present disclosure can be used interchangeably.

In the present disclosure, the terms such as "precoding", "precoder", "weight (precoding weight)", "quasi-co-location (QCL)", "transmission configuration indication state (TCI state)", "spatial relation", "spatial domain filter", "transmit power", "phase rotation", "antenna port", "antenna port group", "layer", "number of layers", "rank", "beam", "beam width", "beam angle", "antenna", "antenna element", and "panel" may be used interchangeably.

In the present disclosure, the terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", may be used interchangeably. The base station may also be referred to with the terms such as a macro cell, a small cell, a femto cell, or a pico cell.

A base station can accommodate one or a plurality of (for example, three) cells. In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head (RRH)). The term "cell" or "sector" refers to a part or all of the coverage area of at least one of a base station and/or a base station subsystem that performs communication service in this coverage.

In the present disclosure, the terms "mobile station (MS)", "user terminal", "user equipment (UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), a robot (manned type or unmanned type). At least one of a base station and a mobile station can be a device that does not necessarily move during the communication operation. For example, at least one of a base station and a mobile station may be an Internet of Things (IoT) device such as a sensor.

Also, the base station in the present disclosure may be read as a user terminal. For example, each aspect/embodiment of the present disclosure may be applied to a configuration in which communication between the base station and the user terminal is replaced by communication among a plurality of user terminals (which may be referred to as, for example, device-to-device (D2D), vehicle-to-everything (V2X), and the like). In this case, the user terminal 20 may be configured to have the function of the base station 10 described above. Words such as "uplink" and "downlink" may also be replaced with wording corresponding to inter-terminal communication (for example, "side"). For example, the uplink channel, the downlink channel, or the like may be read as a side channel.

Likewise, the user terminal in the present disclosure may be read as a base station. In this case, the base station 10 may be configured to have the function of the user terminal 20 described above.

The operation that is performed by the base station in the present disclosure may be performed by its upper node in some cases. In a network including one or a plurality of network nodes having a base station, it is clear that various operations performed for communication with the terminal may be performed by the base station, one or more network nodes (for example, mobility management entity (MME), serving-gateway (S-GW), or the like other than the base station, but not limited thereto) or a combination thereof.

Each aspect/embodiment described in the present disclosure may be used separately or in combination, or may be switched in accordance with the execution. In addition, as long as there is no inconsistency, the order of processing procedures, sequences, flowcharts, and the like of each of the above aspects/embodiments in the present disclosure may be exchanged. For example, the various steps and the sequence of the steps of the methods explained above are exemplary and are not limited to the specific order mentioned above.

Each aspect/embodiment described in the present disclosure may be applied to "Long Term Evolution (LTE)", "LTE-Advanced (LTE-A)", "LTE-Beyond (LTE-B)", "SUPER 3G", "IMT-Advanced", "4th generation mobile communication system (4G)", "5th generation mobile communication system (5G)", Future Radio Access (FRA), New-Radio Access Technology (RAT), New Radio (NR), New radio access (NX), future generation radio access (FX), Global System for Mobile communications (GSM (registered trademark)), CDMA2000, Ultra Mobile Broadband (UMB), IEEE 802.11 (Wi-Fi (registered trademark)), IEEE 802.16 (WiMAX (registered trademark), IEEE 802.20, Ultra-WideBand (UWB), Bluetooth (registered trademark), systems that employ other appropriate radio communication methods, and next-generation systems that are extended based on these. Further, a plurality of systems may be combined (for example, a combination of at least one of the LTE and the LTE-A with the 5G) and applied.

As used in the present disclosure, the phrase "based on" does not mean "based only on" unless explicitly stated otherwise. In other words, the phrase "based on" means both "based only on" and "based at least on".

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

The terms "determining" as used in this disclosure may encompass a wide variety of operations. For example, "determining" may be regarded as "determining" judging, calculating, computing, processing, deriving, investigating, looking up (search, inquiry) (for example, looking up in a table, database, or another data structure), ascertaining, and the like.

In addition, the "determining (deciding)" can include considering performing receiving (for example, receiving information), transmitting (for example, transmitting information), input, output, or accessing (for example, accessing data in a memory) as performing the "determining (deciding)".

In addition, the "determining (deciding)" can include considering performing resolving, selecting, choosing, establishing, or comparing as performing the "determining (deciding)". In other words, "determining (deciding)" may be regarded as "determining (deciding)" of some action.

In addition, the "determining" may be replaced with "assuming", "expecting", "considering", and the like.

The terms "connected" and "coupled" used in the present disclosure, or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access".

In the present disclosure, when two elements are connected, it can be considered that these two elements are "connected" or "coupled" to each other by using one or more wires, cables, printed electrical connections, and the like and as some non-limiting and non-exhaustive examples, by using electromagnetic energy having wavelengths in the radio frequency region, the microwave region, and light (both visible and invisible) regions.

In the present disclosure, the term "A and B are different" may mean "A and B are different from each other". It should be noted that the term may mean "A and B are each different from C". Terms such as "leave", "coupled", or the like may also be interpreted in the same manner as "different".

In the present disclosure, the used terms "include", "including", and variants thereof are intended to be inclusive in a manner similar to the term "comprising". Furthermore, the term "or" used in the present disclosure is intended not to be an exclusive-OR.

Throughout this disclosure, for example, during translation, if articles such as "a", "an", and "the" in English are added, in this disclosure, these articles shall include plurality of nouns following these articles.

Although the present disclosure has been described in detail above, it will be obvious to those skilled in the art that the present disclosure is not limited to the embodiments described in this disclosure. The invention according to the present disclosure can be implemented as modifications and variations without departing from the spirit and scope of the present disclosure as defined by the claims. Therefore, the description of the present disclosure is for the purpose of illustration, and does not have any restrictive meaning to the present disclosure.

The invention claimed is:

1. A terminal comprising:
a receiver that receives a first physical downlink shared channel (PDSCH) scheduled by downlink control information (DCI);
a processor that, when a dynamic hybrid automatic repeat request acknowledgement (HARQ-ACK) codebook is configured, determines a codebook for a first physical uplink control channel (PUCCH) transmitted with repetitions per slot, based on at least one of a total downlink assignment index (T-DAI), a counter downlink assignment index (C-DAI), and information indicating a timing from reception of the first PDSCH to transmission of HARQ-ACK for the first PDSCH, the T-DAI and the C-DAI being included in the DCI; and
a transmitter that transmits, on the first PUCCH, HARQ-ACK based on the codebook,
wherein when a period for repetitions of first PUCCH transmission collides with a period for transmission of an uplink control information (UCI) type which is different from the HARQ-ACK, the processor does not perform to transmit the UCI type and controls to transmit the first PUCCH, and
wherein when the period for repetitions of the first PUCCH transmission collides with a period for a second PUCCH transmission with HARQ-ACK for a second PDSCH, which is different from the first PDSCH, the processor does not perform to transmit the second PUCCH starting at a later slot, and controls to transmit the first PUCCH starting at an earlier slot.

2. A radio communication method for terminal comprising:
receiving a first physical downlink shared channel (PDSCH) scheduled by downlink control information (DCI);
determining, when a dynamic hybrid automatic repeat request acknowledgement (HARQ-ACK) codebook is configured, a codebook for a first physical uplink control channel (PUCCH) transmitted with repetitions per slot, based on at least one of a total downlink assignment index (T-DAI), a counter downlink assignment index (C-DAI), and information indicating a timing from reception of the first PDSCH to transmission of HARQ-ACK for the first PDSCH, the T-DAI and the C-DAI being included in the DCI; and
transmitting, on the first PUCCH, HARQ-ACK based on the codebook;
when a period for repetitions of first PUCCH transmission collides with a period for transmission of an uplink control information (UCI) type which is different from the HARQ-ACK, not performing to transmit the UCI type and controlling to transmit the first PUCCH; and
when the period for repetitions of the first PUCCH transmission collides with a period for a second PUCCH transmission with HARQ-ACK for a second PDSCH, which is different from the first PDSCH, not performing to transmit the second PUCCH starting at a later slot, and controlling to transmit the first PUCCH starting at an earlier slot.

3. A base station comprising:
a transmitter that transmits a first physical downlink shared channel (PDSCH) scheduled by downlink control information (DCI);
a processor that, when a dynamic hybrid automatic repeat request acknowledgement (HARQ-ACK) codebook is configured, indicates to determine a codebook for a first physical uplink control channel (PUCCH) transmitted with repetitions per slot, based on at least one of a total downlink assignment index (T-DAI), a counter downlink assignment index (C-DAI), and information indicating a timing from reception of the first PDSCH to transmission of HARQ-ACK for the first PDSCH, the T-DAI and the C-DAI being included in the DCI; and
a receiver that receives HARQ-ACK, based on the codebook, transmitted by using the first PUCCH,
wherein when a period for repetitions of first PUCCH transmission collides with a period for transmission of an uplink control information (UCI) type which is different from the HARQ-ACK, the processor does not receive the UCI type and controls to receive the first PUCCH, and
wherein when the period for repetitions of the first PUCCH transmission collides with a period for a second PUCCH transmission with HARQ-ACK for a second PDSCH, which is different from the first PDSCH, the processor does not receive the second PUCCH starting at a later slot, and controls to receive the first PUCCH starting at an earlier slot.

4. A system comprising a terminal and a base station, wherein:
the terminal comprises:
a receiver that receives a first physical downlink shared channel (PDSCH) scheduled by downlink control information (DCI);
a processor that, when a dynamic hybrid automatic repeat request acknowledgement (HARQ-ACK) codebook is configured, determines a codebook for a first physical uplink control channel (PUCCH) transmitted with repetitions per slot, based on at least one of a total downlink assignment index (T-DAI), a counter downlink assignment index (C-DAI), and information indicating a timing from reception of the first PDSCH to transmission of HARQ-ACK for the first PDSCH, the T-DAI and the C-DAI being included in the DCI; and
a transmitter that transmits, on the first PUCCH, HARQ-ACK based on the codebook,
wherein when a period for repetitions of first PUCCH transmission collides with a period for transmission of an uplink control information (UCI) type which is different from the HARQ-ACK, the processor does not perform to transmit the UCI type and controls to transmit the first PUCCH, and
wherein when the period for repetitions of the first PUCCH transmission collides with a period for a second PUCCH transmission with HARQ-ACK for a second PDSCH, which is different from the first PDSCH, the processor does not perform to transmit the second PUCCH starting at a later slot, and controls to transmit the first PUCCH starting at an earlier slot; and
the base station comprises:
a transmitter that transmits the first PDSCH;
a processor that, when the dynamic HARQ-ACK codebook is configured, indicates to determine the codebook, based on at least one of the T-DAI, the C-DAI, and the information indicating the timing, the T-DAI and the C-DAI being included in the DCI; and
a receiver that receives the HARQ-ACK,
wherein when the period for repetitions of the first PUCCH transmission collides with the period for transmission of the UCI type, the processor does not receive the UCI type and controls to receive the first PUCCH, and wherein when the period for repetitions of the first PUCCH transmission collides with the period for the second PUCCH transmission, the processor does not receive the second PUCCH starting at the later slot, and controls to receive the first PUCCH starting at the earlier slot.

* * * * *